(12) United States Patent
Yamada

(10) Patent No.: US 12,313,469 B2
(45) Date of Patent: May 27, 2025

(54) LASER INTERFEROMETER

(71) Applicant: SEIKO EPSON CORPORATION, Tokyo (JP)

(72) Inventor: Kohei Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 630 days.

(21) Appl. No.: 17/652,650

(22) Filed: Feb. 25, 2022

(65) Prior Publication Data

US 2022/0276098 A1 Sep. 1, 2022

(30) Foreign Application Priority Data

Feb. 26, 2021 (JP) ................. 2021-029749

(51) Int. Cl.
*G01J 9/02* (2006.01)
*G01J 9/00* (2006.01)
*G02B 26/08* (2006.01)

(52) U.S. Cl.
CPC ............ *G01J 9/02* (2013.01); *G02B 26/0833* (2013.01); *G01J 2009/006* (2013.01); *G01J 2009/0253* (2013.01)

(58) Field of Classification Search
CPC ......... G01J 2009/006; G01J 2009/0253; G01J 9/02; G01J 9/04; G02B 26/002; G02B 26/0833; G01D 21/02; G01B 9/02002; G01B 9/02003; G01B 9/02007; G01B 2290/70
See application file for complete search history.

(56) References Cited

U.S. PATENT DOCUMENTS 6,580,497 B1 6/2003 Asaka et al.
11,668,555 B2 * 6/2023 Yamada .................... G02F 2/00
356/450

(Continued)

FOREIGN PATENT DOCUMENTS

CN 207118890 U 3/2018
JP H0238889 A 2/1990
(Continued)

*Primary Examiner* — Violeta A Prieto
(74) *Attorney, Agent, or Firm* — CHIP LAW GROUP

(57) ABSTRACT

A laser interferometer includes a light source configured to emit first laser light, an optical modulator including a vibrator and configured to modulate, by the vibrator, the first laser light into second laser light having a different frequency, an optical path switching unit disposed in a first optical path through which the first laser light travels and configured to switch a direction of travel of the first laser light between the first optical path and a second optical path different from the first optical path, a reflector including a light-reflecting surface configured to move along the second optical path and reflect the first laser light traveling through the second optical path, and a photoreceptor configured to receive first interference light of the second laser light and third laser light generated by reflection of the first laser light on an object to be measured, and second interference light of the second laser light and fourth laser light generated by reflection of the first laser light on the light-reflecting surface and output a light-receiving signal.

20 Claims, 16 Drawing Sheets

(56) References Cited

U.S. PATENT DOCUMENTS

| | | | |
|---|---|---|---|
| 11,733,027 B2* | 8/2023 | Yamada | G01B 9/02002 |
| | | | 356/450 |
| 11,879,730 B2* | 1/2024 | Kitagawa | G01P 3/366 |
| 2008/0198367 A1* | 8/2008 | Chang | G01N 21/4795 |
| | | | 356/73 |
| 2010/0141954 A1* | 6/2010 | Kobayashi | G01B 9/02087 |
| | | | 356/479 |
| 2018/0049631 A1 | 2/2018 | Takushima et al. | |
| 2020/0309953 A1 | 10/2020 | Yamada | |
| 2022/0065612 A1* | 3/2022 | Yamada | H01S 5/0085 |
| 2022/0065613 A1* | 3/2022 | Kitagawa | G02B 26/06 |
| 2022/0065614 A1* | 3/2022 | Yamada | G01B 9/02045 |
| 2022/0065892 A1* | 3/2022 | Yamada | G01B 9/02045 |
| 2024/0035889 A1* | 2/2024 | Yamada | G01J 3/28 |
| 2024/0045199 A1* | 2/2024 | Yamada | G02B 27/1026 |
| 2024/0151643 A1* | 5/2024 | Kitagawa | G01H 9/00 |
| 2024/0175674 A1* | 5/2024 | Yamada | G01B 9/02083 |
| 2024/0176157 A1* | 5/2024 | Yamada | G01B 9/0201 |
| 2024/0288362 A1* | 8/2024 | Yamada | G01N 21/31 |
| 2024/0319082 A1* | 9/2024 | Yamada | G01N 21/31 |

FOREIGN PATENT DOCUMENTS

| | | | |
|---|---|---|---|
| JP | H06186337 A | 7/1994 | |
| JP | 2000338246 A | 12/2000 | |
| JP | 2007285898 A | 11/2007 | |
| JP | 2020106284 A | 7/2020 | |
| JP | 2020165700 A | 10/2020 | |

* cited by examiner

LASER INTERFEROMETER

The present application is based on, and claims priority from JP Application Serial Number 2021-029749, filed Feb. 26, 2021, the disclosure of which is hereby incorporated by reference herein in its entirety.

BACKGROUND

1. Technical Field

The present disclosure relates to a laser interferometer.

2. Related Art

JP-A-2007-285898 discloses, as a device for measuring a vibration velocity of an object, a laser vibrometer configured to irradiate laser light on an object and measure the vibration velocity on the basis of scattering laser light subjected to a Doppler shift. In this laser vibrometer, a Doppler signal included in the scattering laser light is removed by using an optical heterodyne interferometry method.

Further, in the laser vibrometer described in JP-A-2007-285898, a piezoelectric element or a crystal oscillator having a vibration frequency variable by voltage change is used, and these vibrators are irradiated with laser light, thereby shifting the frequency. With use of laser light having a frequency thus shifted as reference light, the Doppler signal is demodulated from the scattering laser light. By using the Doppler signal thus acquired, it is possible to measure the vibration velocity of the object.

On the other hand, JP-A-2-38889 discloses applying a sinusoidal signal to an optical modulator, receiving by an optical detection element and with respect to a light beam a reference light beam having a frequency that transitions in a sinusoidal wave shape and a reflected light beam acquired upon irradiation of the light beam onto an object, and performing arithmetic processing on a light-receiving signal. Furthermore, JP-A-2-38889 discloses that, even in a case in which the frequency of the reference light beam transitions over time, a signal (beat signal) derived from the object can be acquired and, by passing this beat signal through a frequency modulation (FM) demodulation circuit, the displacement and the vibration velocity of the object can be acquired.

In the method described in JP-A-2-38889, a demodulation process is performed in which the light-receiving signal is split into two, separate arithmetic processes are applied, the signals are subsequently added to eliminate unnecessary terms, and lastly the beat signal is removed. Nevertheless, there is a problem in that, in a case in which the vibration state of the object does not satisfy a predetermined condition, the beat signal cannot be demodulated accurately, and the displacement and the vibration velocity of the object cannot be accurately determined.

SUMMARY

A laser interferometer according to an application example of the present disclosure includes a light source configured to emit first laser light, an optical modulator including a vibrator and configured to use the vibrator to modulate the first laser light into second laser light having a different frequency, an optical path switching unit disposed in a first optical path through which the first laser light travels and configured to switch a direction of travel of the first laser light between the first optical path and a second optical path different from the first optical path, a reflector including a light-reflecting surface configured to move along the second optical path and reflect the first laser light traveling through the second optical path, and a photoreceptor configured to receive first interference light of third laser light generated by reflection of the first laser light on an object to be measured and the second laser light, and second interference light of fourth laser light generated by reflection of the first laser light on the light-reflecting surface and the second laser light and output a light-receiving signal.

DESCRIPTION OF EXEMPLARY EMBODIMENTS

Figure 1:
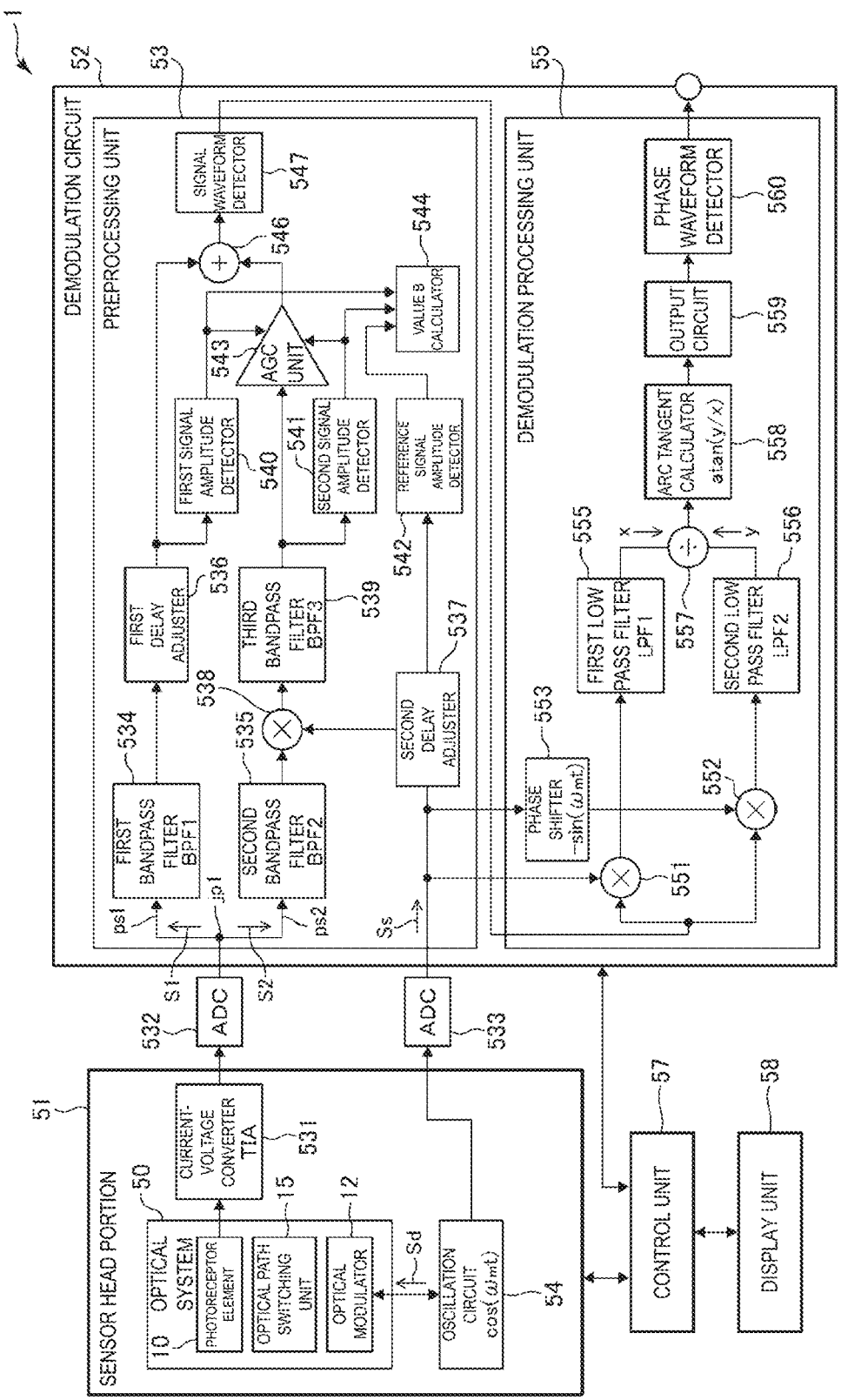
FIG. 1 is a functional block diagram illustrating a laser interferometer according to an exemplary embodiment.

A laser interferometer according to the present disclosure will be described in detail below with reference to exemplary embodiments illustrated in accompanying drawings. FIG. 1 is a functional block diagram illustrating a laser interferometer according to an exemplary embodiment.

A laser interferometer 1 illustrated in FIG. 1 includes a sensor head 51 including an optical system 50 and an oscillation circuit 54, a demodulation circuit 52 into which a light-receiving signal from the optical system 50 is input, and a control unit 57.

1. Sensor Head

Figure 2:
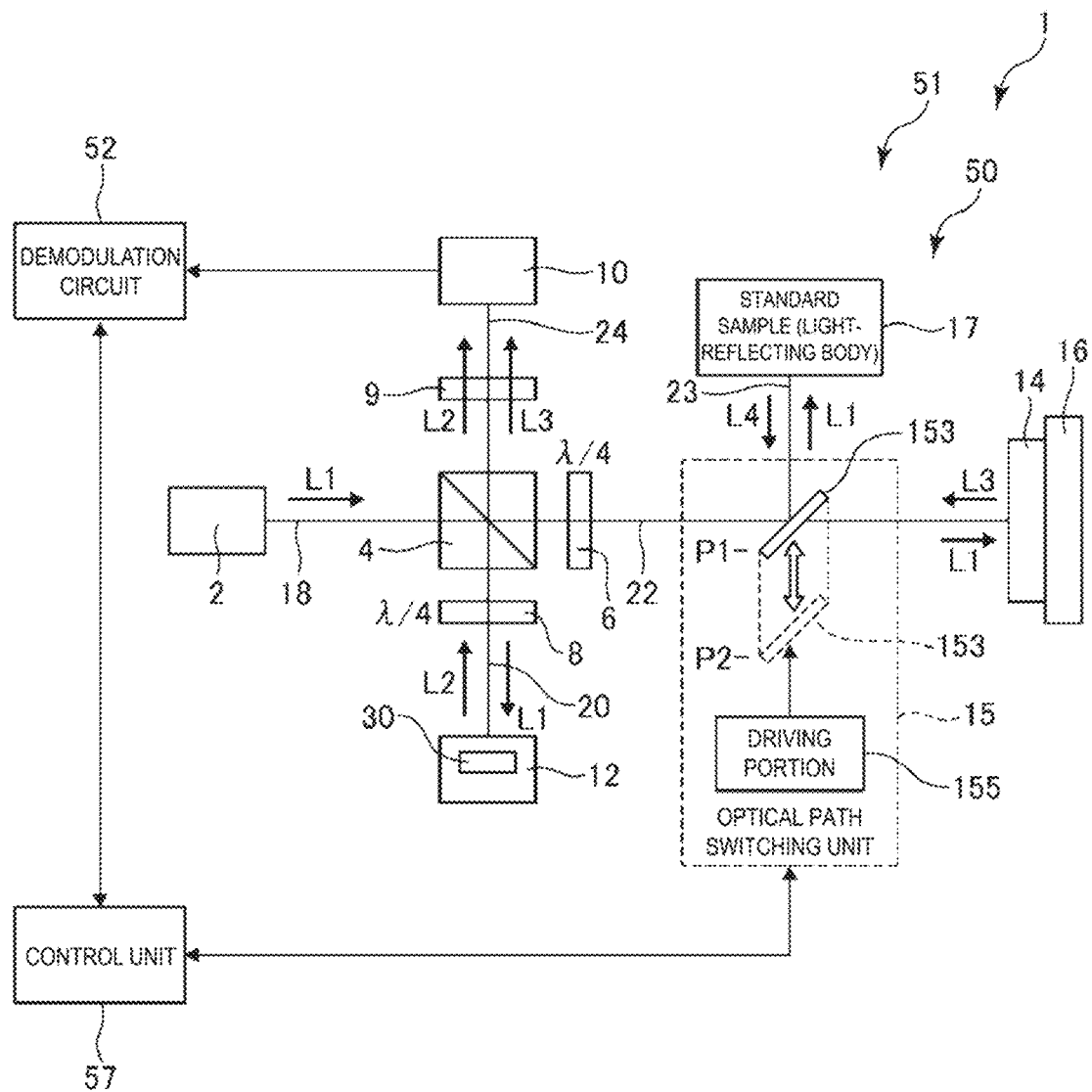
FIG. 2 is a schematic configuration diagram illustrating a sensor head illustrated in FIG. 1.

FIG. 2 is a schematic configuration diagram illustrating the sensor head 51 illustrated in FIG. 1.

The sensor head 51 includes the optical system 50 as previously described.

As illustrated in FIG. 2, the optical system 50 includes a light source 2, a polarizing beam splitter 4, a quarter wavelength plate 6, a quarter wavelength plate 8, an analyzer 9, a photoreceptor 10, an optical modulator 12 of a frequency shifter type, an optical path switching unit 15, a setting portion 16 into which a measured object 14 is set, and a standard sample 17.

The light source 2 emits emitted light L1 (first laser light) of a predetermined wavelength. The photoreceptor 10 converts the received light into an electrical signal. The optical modulator 12 includes a vibrator 30 and is configured to modulate the emitted light L1 and generate reference light L2 (second laser light) including a modulation signal. The setting portion 16 may be provided as necessary, and enables placement of the measured object 14. The emitted light L1 incident on the measured object 14 is reflected as object light L3 (third laser light) including a sample signal derived from the measured object 14.

An optical path of the emitted light L1 emitted from the light source 2 is defined as an optical path 18. The optical path 18 is joined with an optical path 20 by reflection by the polarizing beam splitter 4. On the optical path 20, the quarter wavelength plate 8 and the optical modulator 12 are disposed in this order from the polarizing beam splitter 4 side. Further, the optical path 18 is joined with an optical path 22 by transmission by the polarizing beam splitter 4. On the optical path 22, the quarter wavelength plate 6, the optical path switching unit 15, and the setting portion 16 are disposed in this order from the polarizing beam splitter 4 side.

The optical path 20 is joined with an optical path 24 by transmission by the polarizing beam splitter 4. On the optical path 24, the analyzer 9 and the photoreceptor 10 are disposed in this order from the polarizing beam splitter 4 side.

The emitted light L1 emitted from the light source 2 is incident on the optical modulator 12 via the optical path 18 and the optical path 20. Further, the emitted light L1 is incident on the measured object 14 via the optical path 18 and the optical path 22. The reference light L2 generated by the optical modulator 12 is incident on the photoreceptor 10 via the optical path 20 and the optical path 24. The object light L3 generated by the reflection by the measured object 14 is incident on the photoreceptor 10 via the optical path 22 and the optical path 24.

An optical path 23 is an optical path between the optical path switching unit 15 and the standard sample 17. When a direction of travel of the emitted light L1 is changed to the optical path 23 by the optical path switching unit 15, the emitted light L1 is reflected by the standard sample 17 and returns to the optical path switching unit 15 as standard object light L4. Subsequently, the standard object light L4 is incident on the photoreceptor 10 via the optical path 22 and the optical path 24.

Each portion of the optical system 50 will be further described below.

1.1 Light Source

The light source 2 is a laser light source that emits the emitted light L1 having a narrow line width and coherence. When the line width is expressed in terms of frequency difference, a laser light source having a line width of the MHz band or less is preferably used. Specific examples include a gas laser such as a HeNe laser, and a semiconductor laser element such as a distributed feedback-laser diode (DFB-LD), a laser diode with fiber Bragg grating (FBG-LD), and a vertical cavity surface emitting laser (VCSEL).

The light source 2 preferably includes a semiconductor laser element, in particular. This makes it possible to make the light source 2 particularly smaller. As a result, the laser interferometer 1 can be made smaller. In particular, of the laser interferometer 1, the sensor head 51 in which the optical system 50 is accommodated can be made smaller and lighter, which is further useful in improving an operability of the laser interferometer 1.

1.2 Polarizing Beam Splitter

The polarizing beam splitter 4 is an optical element that divides incident light into transmitted light and reflected light. The polarizing beam splitter 4 has a function of transmitting P-polarized light and reflecting S-polarized light. Hereinafter, a case is considered in which the emitted light L1, having a ratio of P-polarized light to S-polarized light of, for example, 50:50, is incident on the polarizing beam splitter 4.

In the polarizing beam splitter 4, as described above, the S-polarized light of the emitted light L1 is reflected and the P-polarized light is transmitted.

The S-polarized light of the emitted light L1 reflected by the polarizing beam splitter 4 is converted into circularly polarized light by the quarter wavelength plate 8 and incident on the optical modulator 12. The circularly polarized light of the emitted light L1 incident on the optical modulator 12 undergoes a frequency shift of $f_m$ [Hz] and is reflected as the reference light L2. Accordingly, the reference light L2 includes a modulation signal of a modulation frequency $f_m$ [Hz]. The reference light L2 is converted into P-polarized light when transmitted through the quarter wavelength plate 8 again. The P-polarized light of the reference light L2 is transmitted through the polarizing beam splitter 4 and the analyzer 9 and incident on the photoreceptor 10.

The P-polarized light of the emitted light L1 transmitted through the polarizing beam splitter 4 is converted into circularly polarized light by the quarter wavelength plate 6 and incident on the measured object 14 in a moving state. The circularly polarized light of the emitted light L1 incident on the measured object 14 undergoes a Doppler shift of $f_d$ [Hz] and is reflected as the object light L3. Accordingly, the object light L3 includes a sample signal of a frequency $f_d$ [Hz]. The object light L3 is converted into S-polarized light when passing through the quarter wavelength plate 6 again via the optical path switching unit 15. The S-polarized light of the object light L3 is reflected by the polarizing beam splitter 4, transmitted through the analyzer 9, and incident on the photoreceptor 10.

The emitted light L1 has coherence as described above, and thus the reference light L2 and the object light L3 are incident on the photoreceptor 10 as first interference light.

Note that a depolarizing beam splitter may be used instead of the polarizing beam splitter. In this case, the quarter wavelength plate 6 and the quarter wavelength plate 8 are not required, and thus the laser interferometer 1 can be made smaller by a reduction in the number of components.

1.3 Analyzer

The S-polarized light and the P-polarized light orthogonal to each other are independent of each other, and thus interference does not appear simply by superimposition. Therefore, a light wave obtained by superimposing the S-polarized light and the P-polarized light is passed through the analyzer 9 tilted 45° with respect to both the S-polarized light and the P-polarized light. With use of the analyzer 9, it is possible to transmit light of components common to each other and generate interference. As a result, in the analyzer 9, the reference light L2 and the object light L3 interfere, and first interference light having a frequency of $f_m$-$f_d$ Hz is generated.

1.4 Photoreceptor

The reference light L2 and the object light L3 are incident on the photoreceptor 10 via the polarizing beam splitter 4 and the analyzer 9. As a result, the reference light L2 and the object light L3 undergo optical heterodyne interference, and the first interference light having a frequency of $f_m$-$f_d$ [Hz] is incident on the photoreceptor 10. The sample signal is demodulated from the first interference light by the method described below, making it possible to ultimately determine the movement, that is, vibration velocity and displacement, of the measured object 14. Examples of the photoreceptor 10 include a photodiode.

1.5 Optical Modulator

Figure 3:
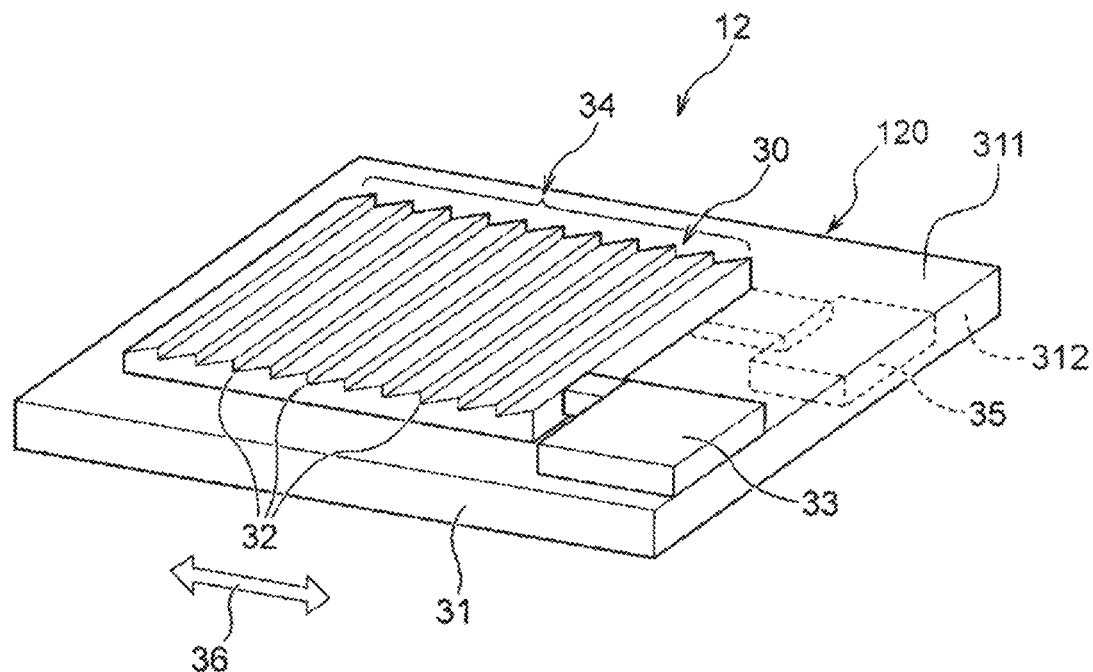
FIG. 3 is a perspective view illustrating a first configuration example of an optical modulator illustrated in FIG. 2.

FIG. 3 is a perspective view illustrating a first configuration example of the optical modulator 12 illustrated in FIG. 2.

1.5.1 Overview of First Configuration Example of Optical Modulator

The frequency shifter type optical modulator 12 includes an optical modulation oscillator 120. The optical modulation oscillator 120 illustrated in FIG. 3 includes the vibrator 30 having a plate shape and a substrate 31 that supports the vibrator 30.

The vibrator 30 is made of a material that, with application of a potential, repeats a mode of vibrating so as to be distorted in a direction along a surface. In this configuration example, the vibrator 30 is a crystal AT oscillator that vibrates in a thickness-shear mode in a vibration direction 36 in the high frequency region of the MHz band. A diffraction grating 34 is formed on a front surface of the vibrator 30. The diffraction grating 34 has a structure in which a plurality of grooves 32 linear in shape are periodically arranged.

The substrate 31 includes a front surface 311 and a back surface 312 having a front and back relationship with each other. The vibrator 30 is disposed on the front surface 311. Further, a pad 33 for applying a potential to the vibrator 30 is provided on the front surface 311. On the other hand, a pad 35 for applying a potential to the vibrator 30 is also provided on the back surface 312.

A size of the substrate 31 is, for example, about from 0.5 mm to 10.0 mm on the long side. Further, a thickness of the substrate 31 is, for example, about from 0.10 mm to 2.0 mm. As an example, a shape of the substrate 31 is a square with a side of 1.6 mm and a thickness of 0.35 mm.

A size of the vibrator 30 is, for example, about from 0.2 mm to 3.0 mm on the long side. Further, a thickness of the vibrator 30 is, for example, about from 0.003 mm to 0.5 mm.

As an example, a shape of the vibrator 30 is a square with a side of 1.0 mm and a thickness of 0.07 mm. In this case, the vibrator 30 oscillates at a fundamental oscillation frequency of 24 MHz. Note that the oscillation frequency can be adjusted within a range of from 1 MHz to 1 GHz by changing the thickness of the vibrator 30 and considering overtone.

Note that, in FIG. 3, the diffraction grating 34 is formed on the entire front surface of the vibrator 30, but may be formed on only a portion.

An intensity of the optical modulation by the optical modulator 12 is given by an inner product of a difference wave vector between a wave vector of the emitted light L1 incident on the optical modulator 12 and a wave vector of the reference light L2 emitted from the optical modulator 12, and a vector of the vibrator 30 in the vibration direction 36. In this configuration example, the vibrator 30 vibrates in a thickness-shear mode, but this vibration is an in-plane vibration and thus, even if light is orthogonally incident on the front surface of the vibrator 30 alone, optical modulation cannot be achieved. Therefore, in this configuration example, the diffraction grating 34 is provided to the vibrator 30, making optical modulation possible by the principle described below.

The diffraction grating 34 illustrated in FIG. 3 is a blazed diffraction grating. Blazed diffraction grating refers to a diffraction grating having a stepped cross-sectional shape. The groove 32 of the diffraction grating 34 and having a linear shape is provided with an extending direction thereof orthogonal to the vibration direction 36.

When a drive signal Sd is supplied from the oscillation circuit 54 illustrated in FIG. 1 to the vibrator 30 illustrated in FIG. 3 (when alternating current voltage is applied), the vibrator 30 oscillates. The power (drive power) required for oscillation of the vibrator 30 is not particularly limited, but is a small value of about from 0.1 µW to 100 mW. As a result, the drive signal Sd output from the oscillation circuit 54 can be used to oscillate the vibrator 30 without being amplified.

Further, optical modulators in the related art require a structure that maintains the temperature of the optical modulator, making volume reduction difficult. Further, the power consumption of the optical modulator is large, resulting in the problem that the size and the power consumption of the interferometer is difficult to reduce. In contrast, in this configuration example, the volume of the vibrator 30 is extremely small, and the power required for oscillation is also small, making it easy to reduce the size and the power consumption of the laser interferometer 1.

1.5.2 Method of Forming Diffraction Grating

The method of forming the diffraction grating 34 is not particularly limited, but examples include a method of making a mold using a method based on mechanical engraving (ruling engine), and forming the grooves 32 by a nanoimprint method on an electrode formed on the front surface of the vibrator 30 of the crystal AT oscillator. Here, the reason for formation on the electrode is that, in the case of a crystal AT oscillator, high-quality vibration in a thickness-shear mode can be generated on an electrode, in principle. Note that the grooves 32 are not limited to being formed on an electrode, and may be formed on a front surface of a material of a non-electrode portion. Further, instead of a nanoimprint method, a processing method based on exposure and etching, an electron beam drawing lithography method, a focused ion beam processing method (FIB), or the like may be used.

Further, the diffraction grating may be formed on a chip of the crystal AT oscillator with a resist material, and a mirror film made of a metal film or a dielectric multilayer film may be provided thereon. By providing a metal film or a mirror film, it is possible to increase a reflectivity of the diffraction grating 34.

Furthermore, a resist film may be formed on a chip or a wafer of the crystal AT oscillator and, after processing is performed by etching, the resist film may be removed, and subsequently a metal film or a mirror film may be formed on the processed surface. In this case, because the resist material is removed, the effect of moisture absorption or the like of the resist material is eliminated, making it possible to increase a chemical stability of the diffraction grating 34. Further, by providing a metal film having high conductivity such as Au or Al, it is also possible to use the film as an electrode for driving the vibrator 30.

Note that the diffraction grating 34 may be formed using techniques such as anodized alumina (porous alumina).

1.5.3 Other Configuration Examples of Optical Modulator

The vibrator 30 is not limited to a crystal oscillator and may be, for example, a Si oscillator, a surface acoustic wave (SAW) device, or the like.

Figure 4:
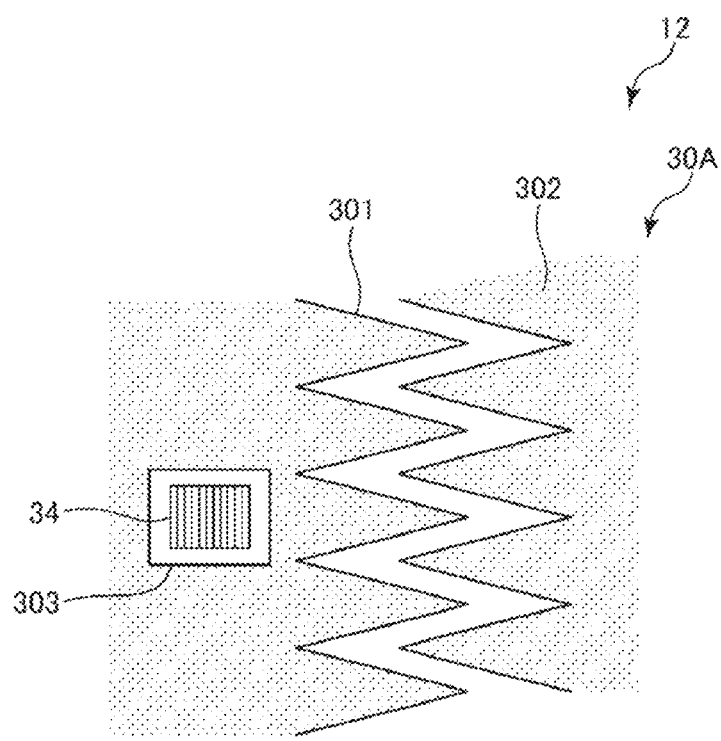
FIG. 4 is a plan view illustrating a portion of a second configuration example of the optical modulator.
Figure 5:
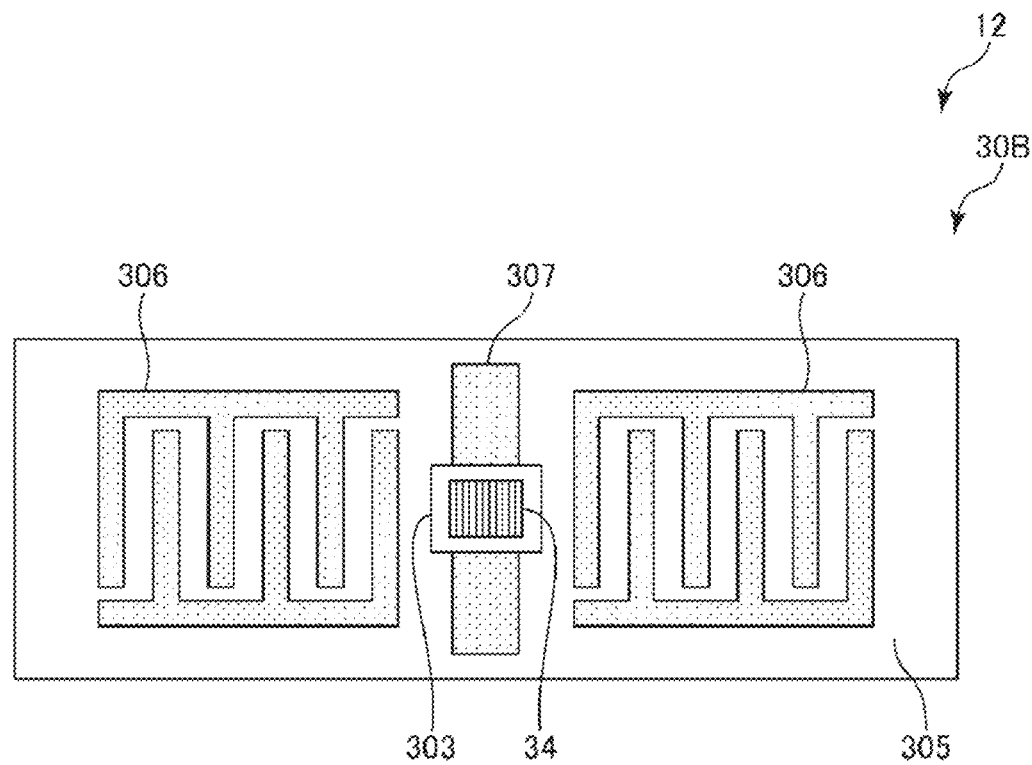
FIG. 5 is a perspective view illustrating a third configuration example of the optical modulator.

FIG. 4 is a plan view illustrating a portion of a second configuration example of the optical modulator 12. FIG. 5 is a perspective view illustrating a third configuration example of the optical modulator 12.

A vibrator 30A illustrated in FIG. 4 is a Si oscillator manufactured using MEMS technology. MEMS is an abbreviation for micro-electromechanical systems.

The vibrator 30A includes a first electrode 301 and a second electrode 302 adjacent to each other on the same plane with a gap therebetween, a diffraction grating mounting portion 303 provided on the first electrode 301, and the diffraction grating 34 provided on the diffraction grating mounting portion 303. The first electrode 301 and the second electrode 302 vibrate with, for example, electrostatic attraction as a driving force, so as to repeatedly approach and separate from each other in a left-right direction in FIG. 4, that is, along an axis coupling the first electrode 301 and the second electrode 302 illustrated in FIG. 4. As a result, in-plane vibration can be imparted to the diffraction grating 34. The oscillation frequency of the Si oscillator is, for example, about from 1 kHz to several 100 MHz.

A vibrator 30B illustrated in FIG. 5 is a SAW device that utilizes surface waves. SAW is an abbreviation for surface acoustic wave.

The vibrator 30B includes a piezoelectric substrate 305, a comb-shaped electrode 306 provided on the piezoelectric substrate 305, a grounding electrode 307, the diffraction grating mounting portion 303, and the diffraction grating 34. When an alternating current voltage is applied to the comb-shaped electrode 306, the surface acoustic wave is excited by the inverse piezoelectric effect. As a result, in-plane vibration can be imparted to the diffraction grating 34. The oscillation frequency of the SAW device is, for example, about from several 100 MHz to several GHz.

For a device such as that described above as well, with the diffraction grating 34 being provided, optical modulation can be achieved by the principle described below, similar to the case of the crystal AT oscillator.

On the other hand, when the vibrator 30 includes a crystal oscillator, the extremely high Q value of the crystal can be utilized to generate a highly accurate modulation signal. The Q value is an index indicating a sharpness of the resonance peak. Further, the crystal oscillator has the characteristic of being less susceptible to disturbance. Accordingly, with use of a modulated signal modulated by the optical modulator 12 provided with a crystal oscillator, the sample signal derived from the measured object 14 can be acquired with high accuracy.

1.5.4 Optical Modulation by Vibrator

Next, the principle of modulating light using the vibrator 30 will be described.

Figure 6:
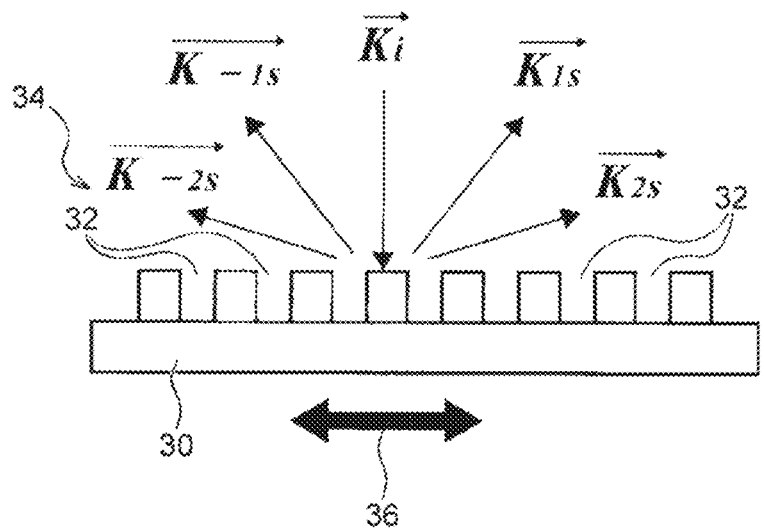
FIG. 6 is a conceptual view for explaining a plurality of diffraction light produced when incident light $K_i$ is incident on a front surface of a vibrator from a direction orthogonal to the front surface.

FIG. 6 is a conceptual view for explaining a plurality of diffraction light produced when incident light $K_i$ is incident from a direction orthogonal to the front surface of the vibrator 30.

When incident light $K_i$ is incident on the diffraction grating 34 that vibrates in a thickness-shear mode in the vibration direction 36, a plurality of diffracted light $K_{ns}$ are produced as illustrated in FIG. 6 due to a diffraction phenomenon. n denotes the order of the diffracted light $K_{ns}$, and equals 0, ±1, ±2, . . . . Note that, rather than the blazed diffraction grating illustrated in FIG. 3, the diffraction grating 34 illustrated in FIG. 6 is, as another example of the diffraction grating, a diffraction grating based on repeated concavities and convexities. Further, in FIG. 6, the diffraction light $K_{Os}$ is not illustrated.

In FIG. 6, the incident light $K_i$ is incident from a direction orthogonal to the front surface of the vibrator 30, but this incident angle is not particularly limited. The incident angle may be set so that the incident light $K_i$ is obliquely incident on the front surface of the vibrator 30. When the incident light $K_i$ is obliquely incident, the direction of travel of the diffracted light $K_{ns}$ also changes accordingly.

Note that, depending on the design of the diffraction grating 34, higher order light of |n|≥2 may not emerge. Thus, it is desirable to set |n|=1 to stably acquire the modulation signal. That is, in the laser interferometer 1 of FIG. 2, the frequency shifter type optical modulator 12 is preferably disposed so that the ±1 order diffracted light is utilized as the reference light L2. This arrangement makes it possible to achieve stabilization of measurement by the laser interferometer 1.

On the other hand, in a case in which a light of a higher order of |n|≥2 emerges from the diffraction grating 34, the optical modulator 12 may be disposed so that, rather than diffracted light of ±1 order, any diffracted light of the ±2 order or greater is utilized as the reference light L2. This makes it possible to utilize diffracted light of a higher order, and thus increase the frequency and reduce the size of the laser interferometer 1.

In this exemplary embodiment, as an example, the optical modulator 12 is configured so that an angle formed by an entering direction of the incident light $K_i$ incident on the optical modulator 12 and a direction of travel of the reference light L2 emitted from the optical modulator 12 is 180°. Hereinafter three examples will be described.

Figure 7:
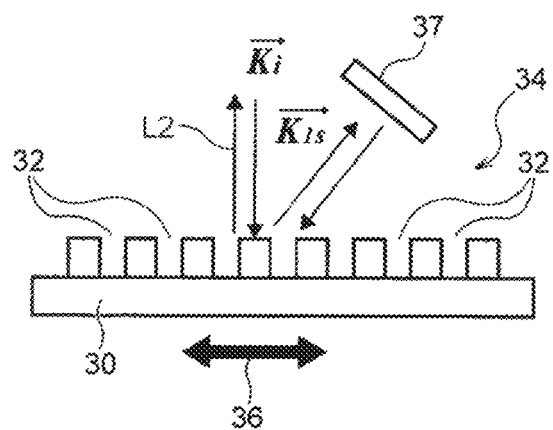
FIG. 7 is a conceptual view for explaining the optical modulator configured so that an angle formed by a direction of travel of the incident light $K_i$ and a direction of travel of reference light L2 is 180°.
Figure 8:
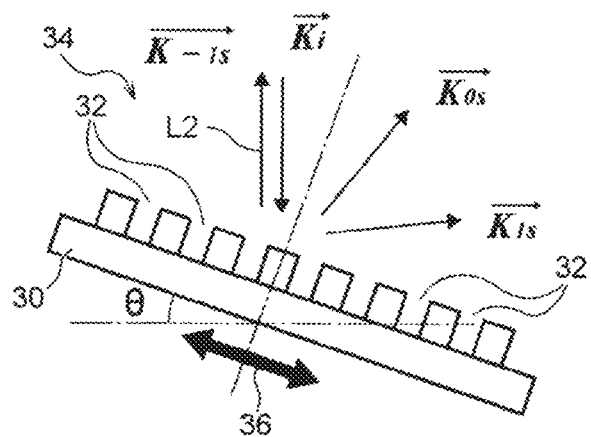
FIG. 8 is a conceptual view for explaining the optical modulator configured so that an angle formed by a direction of travel of the incident light $K_i$ and a direction of travel of the reference light L2 is 180°.
Figure 9:
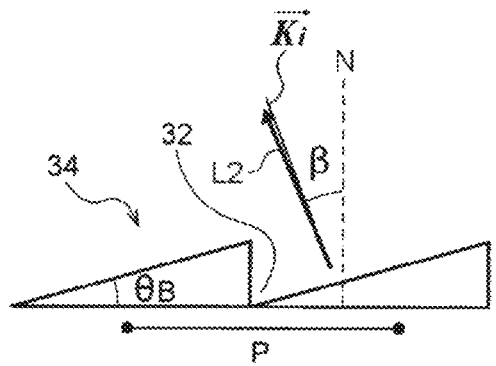
FIG. 9 is a conceptual view for explaining the optical modulator configured so that an angle formed by a direction of travel of the incident light $K_i$ and a direction of travel of the reference light L2 is 180°.

FIG. 7 to FIG. 9 are conceptual views for explaining the optical modulator 12 configured so that an angle formed by the direction of travel of the incident light $K_i$ and the direction of travel of the reference light L2 is 180°.

In FIG. 7, the optical modulator 12 includes a mirror 37 in addition to the vibrator 30. The mirror 37 is disposed so as to reflect the diffracted light $K_{1s}$ back to the diffraction grating 34. At this time, an angle formed by the incident angle of the diffracted light $K_{1s}$ with respect to the mirror 37 and the reflection angle of the mirror 37 is 180°. As a result, the diffracted light $K_{1s}$ emitted from the mirror 37 and returned to the diffraction grating 34 diffracts once again at the diffraction grating 34 and travels in a direction opposite to the direction of travel of the incident light $K_i$ incident on the optical modulator 12. Thus, with the addition of the mirror 37, the aforementioned condition that the angle formed by the entering direction of the incident light $K_i$ and the direction of travel of the reference light L2 is 180° can be satisfied.

Further, by traveling via the mirror 37 in this way, the reference light L2 generated by the optical modulator 12 is frequency-modulated twice. Accordingly, with the mirror 37 used in combination, frequency modulation of a higher frequency is possible as compared to the case in which the vibrator 30 alone is used.

In FIG. 8, the vibrator 30 is inclined with respect to the arrangement in FIG. 6. An inclination angle θ at this time is set so as to satisfy the aforementioned condition that the angle formed by the entering direction of the incident light $K_i$ and the direction of travel of the reference light L2 is 180°.

The diffraction grating 34 illustrated in FIG. 9 is a blazed diffraction grating having a blaze angle $\theta_B$. Then, when the incident light $K_i$ traveling at an incident angle β with respect to a normal line N of the front surface of the vibrator 30 is incident on the diffraction grating 34, the reference light L2 returns at the same angle as the blaze angle $\theta_B$ with respect to the normal line N. Accordingly, by making the incident angle β equal to the blaze angle $\theta_B$, it is possible to satisfy the aforementioned condition that the angle formed by the entering direction of the incident light $K_i$ and the direction of travel of the reference light L2 is 180°. In this case, the condition can be satisfied without using the mirror 37 illustrated in FIG. 7 and without inclining the vibrator 30 itself as illustrated in FIG. 8, making it possible to further reduce the size and increase the frequency of the laser interferometer 1. In particular, in the case of a blazed diffraction grating, the arrangement satisfying the condition described above is referred to as a retro arrangement, and additionally has the advantage that the diffraction efficiency of the diffracted light can be particularly increased.

Note that a pitch P in FIG. 9 represents the pitch of the blazed diffraction grating, and the pitch P is, as an example, 1 μm. Further, the blaze angle $\theta_B$ is set to 25°. In this case, in order to satisfy the condition described above, the incident angle β of the incident light $K_i$ with respect to the normal line N need only be set to 25° as well.

1.5.5 Package Structure

Figure 10:
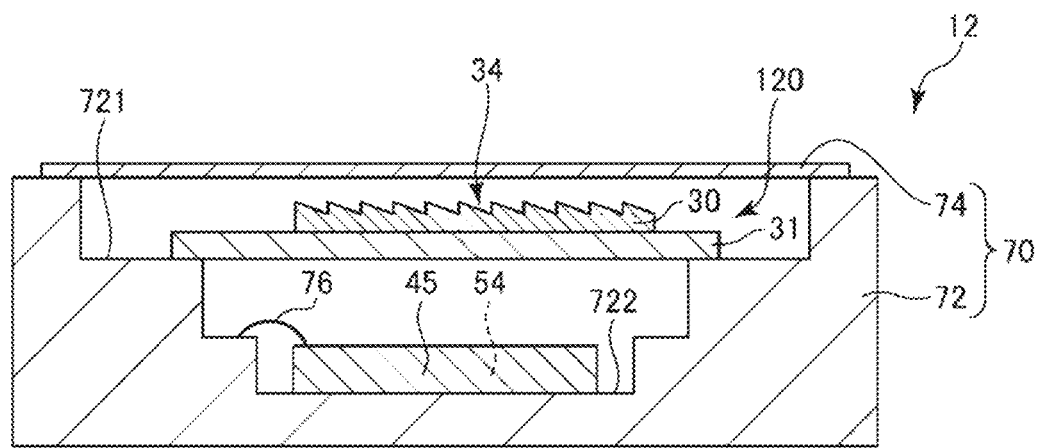
FIG. 10 is a cross-sectional view illustrating the optical modulator having a package structure.

FIG. 10 is a cross-sectional view illustrating the optical modulator 12 having a package structure.

The optical modulator 12 illustrated in FIG. 10 includes a container 70 that is a housing, the optical modulation oscillator 120 accommodated in the container 70, and a circuit element 45 constituting the oscillation circuit 54. Note that the container 70 is hermetically sealed in a reduced pressure atmosphere such as a vacuum or in an inert gas atmosphere such as that of nitrogen or argon, for example.

The container 70 includes a container main body 72 and a lid 74, as illustrated in FIG. 10. Of these, the container main body 72 includes a first recessed portion 721 provided in an interior thereof, and a second recessed portion 722 provided inside the first recessed portion 721 and deeper than the first recessed portion 721. The container main body 72 is constituted by, for example, a ceramic material or a resin material. Further, although not illustrated, the container main body 72 includes an internal terminal provided on an inner surface, an external terminal provided on an outer surface, a wiring line coupling the internal terminal and the external terminal, and the like.

Further, an opening of the container main body 72 is blocked by the lid 74 with a sealing member such as a seal ring or low melting point glass (not illustrated) interposed therebetween. A material that can transmit laser light, such as a glass material, for example, is used for the constituent material of the lid 74.

The optical modulation oscillator 120 is disposed on a bottom surface of the first recessed portion 721. The optical modulation oscillator 120 is supported on the bottom surface of the first recessed portion 721 by a bonding member (not illustrated). Further, the internal terminal of the container main body 72 and the optical modulation oscillator 120 are electrically coupled via a conductive material (not illustrated) such as a bonding wire or a bonding metal, for example.

The circuit element 45 is disposed on a bottom surface of the second recessed portion 722. The circuit element 45 is electrically coupled to the internal terminal of the container main body 72 via a bonding wire 76. As a result, the optical modulation oscillator 120 and the circuit element 45 are also electrically coupled to each other via a wiring line provided in the container main body 72. Note that a circuit other than the oscillation circuit 54 described below may be provided on the circuit element 45.

With adoption of such a package structure, the optical modulation oscillator 120 and the circuit element 45 can be layered, making it possible to bring the two physically closer to each other and thus shorten a wiring length between the optical modulation oscillator 120 and the circuit element 45. This makes it possible to suppress the entry of external noise into the drive signal Sd and the contrary formation of the drive signal Sd into a noise source. Further, in the one container 70, both the optical modulation oscillator 120 and the circuit element 45 can be protected from the external environment. Thus, the reliability of the laser interferometer 1 can be increased while making the sensor head 51 smaller.

Note that the structure of the container 70 is not limited to the illustrated structure and, for example, the optical modulation oscillator 120 and the circuit element 45 may have separate package structures. Further, although not illustrated, the container 70 may accommodate other circuit elements that constitute the oscillation circuit 54. Note that the container 70 need only be provided as necessary, and may be omitted.

1.6 Optical Path Switching Unit

The optical path switching unit 15 illustrated in FIG. 2 has a function of switching the optical path through which the emitted light L1 travels from the optical path 22 (first optical path) to the optical path 23 (second optical path). As described above, the optical path 22 is an optical path connecting the polarizing beam splitter 4 and the setting portion 16. The optical path 23 is an optical path intersecting the optical path 22 and connecting the optical path switching unit 15 and the standard sample 17.

The optical path switching unit 15 includes an optical path changing element 153 and a driving portion 155. The optical path changing element 153 is configured to move to a first position P1 and a second position P2. In FIG. 2, the optical path changing element 153 is configured to reciprocate between the first position P1 and the second position P2, but may also be configured to move to other positions. The optical path changing element 153 is a mirror that reflects laser light, thereby converting the optical path, for example. In FIG. 2, a light-reflecting surface of the optical path changing element 153 is inclined with respect to the optical path 22, making it possible to change the direction of travel of the emitted light L1 propagating through the optical path 22 to the optical path 23. Further, the optical path changing element 153 can change the direction of travel of the standard object light L4 propagating through the optical path 23 to the optical path 22.

The first position P1 is a position at which the optical path changing element 153 crosses the optical path 22. Accordingly, the optical path changing element 153 disposed in the first position P1 can change the direction of travel of the emitted light L1 to the optical path 23.

The emitted light L1 propagating through the optical path 23 is incident on the standard sample 17 and reflected as the standard object light L4 that includes the standard sample signal derived from the standard sample 17. The direction of travel of the standard object light L4 is changed from the optical path 23 to the optical path 22 by the optical path changing element 153. Then, the standard object light L4 is received by the photoreceptor 10 via the quarter wavelength plate 6, the polarizing beam splitter 4, and the analyzer 9. Thus, the reference light L2 and the standard object light L4 are incident on the photoreceptor 10 as second interference light.

The second position P2 is a position at which the optical path changing element 153 does not cross the optical path 22. Accordingly, the optical path changing element 153 disposed in the second position P2 does not change the direction of travel of the emitted light L1. Accordingly, when the optical path changing element 153 is in the second position P2, the emitted light L1 propagating through the optical path 22 is incident on the measured object 14.

The driving portion 155 generates a driving force and moves the optical path changing element 153. Further, the driving portion 155 holds the optical path changing element 153 in a target position. As the driving portion 155, a device that drives the optical path changing element 153 along a straight line is used, and examples include a linear stage, an electromagnetic drive actuator, and a piezo actuator. Note that the driving portion 155 may be a device that moves the optical path changing element 153 to the first position P1 and the second position P2 by rotating the optical path changing element 153 about a rotation axis. Examples of such a device include various motors.

As described above, the optical path switching unit 15 includes the optical path changing element 153 and the driving portion 155 (optical path changing element driving portion). The optical path changing element 153 moves to the first position P1 and the second position P2. The driving portion 155 moves the optical path changing element 153. The first position P1 is a position at which the optical path changing element 153 changes the direction of travel of the emitted light L1 (first laser light). The second position P2 is a position at which the optical path changing element 153 does not change the direction of travel of the emitted light L1.

According to such a configuration, the optical path 22 that causes the emitted light L1 to be incident on the measured object 14 can be switched to the optical path 23 that causes the emitted light L1 to be incident on the standard sample 17 in a simple configuration. Thus, according to the optical path switching unit 15, an automatic gain control (AGC) coefficient recording mode and a measurement mode can be readily switched. Further, the laser interferometer 1 can be readily made smaller and lighter.

Note that the optical path changing element 153 is not limited to a mirror such as described above, and may be, for example, a shutter member that blocks laser light. In this case, the optical path switching unit 15 includes an optical distributer that branches the emitted light L1 into the optical path 22 and the optical path 23, and a shutter member that blocks either the optical path 22 or the optical path 23 after the branching. The position at which the shutter member, which is the optical path changing element 153, blocks the optical path 22 corresponds to the first position P1 described above, and the position at which the shutter member blocks the optical path 23 corresponds to the second position P2 described above. In the optical distributor, the emitted light L1 is constantly distributed to both the optical path 22 and the optical path 23 and thus, when the shutter member is in the first position P1, the direction of travel of the emitted light L1 is changed to the optical path 23 and, when the shutter member is in the second position P2, the direction of travel of the emitted light L1 is not changed. Thus, even in a configuration in which such a shutter member is used, the optical path switching unit 15 realizes the same function as that described above.

Further, while the shutter member may be configured to block either the optical path 22 or the optical path 23, the shutter member may also be configured to include a first member that blocks the optical path 22 and a second member that blocks the optical path 23. In the latter case, the same function as that described above is realized by interlocking the operation of the first member and the operation of the second member.

2. Control Unit

The control unit 57 controls the operation of the optical path switching unit 15 and the operation of the demodulation circuit 52.

Specifically, the control unit 57 controls the operation of the optical path switching unit 15 in accordance with the operation state of the demodulation circuit 52. The demodulation circuit 52 operates in two operating modes: AGC coefficient recording mode and measurement mode described below. The control unit 57 switches the operation of the optical path switching unit 15 in accordance with this operating mode.

The hardware configuration of the control unit 57, although not illustrated, includes, for example, a processor, a memory, and an external interface coupled to each other by an internal bus. The processor reads and executes the program stored in the memory, thereby realizing various controls by the control unit 57, such as switching control between AGC coefficient recording mode and measurement mode, for example.

Further, the laser interferometer 1 illustrated in FIG. 1 includes a display unit 58 coupled to the control unit 57. The control unit 57 controls the display operation of the display unit 58. As a result, an output result, error content, notification content, and the like of the demodulation circuit 52 can be displayed on the display unit 58 and made known to a user. Examples of the display unit 58 include a liquid crystal display device.

3. Oscillation Circuit

As illustrated in FIG. 1, the oscillation circuit 54 outputs the drive signal Sd input to the optical modulator 12 of the optical system 50. The oscillation circuit 54 outputs a reference signal Ss input to the demodulation circuit 52.

Figure 11:
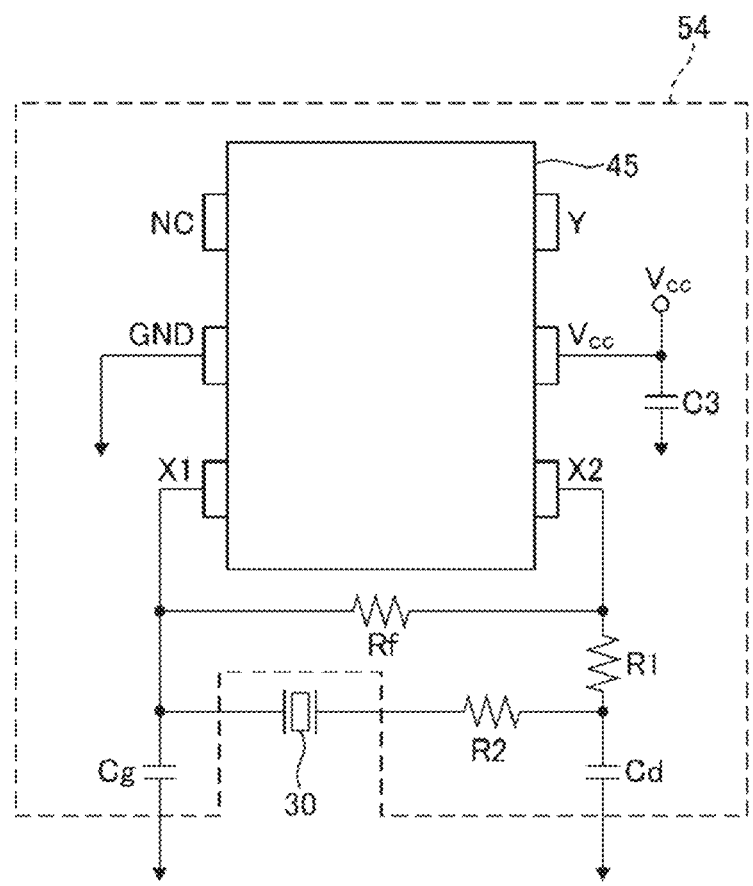
FIG. 11 is a circuit view illustrating a configuration of a general inverter oscillation circuit.

The oscillation circuit 54 is not particularly limited as long as a circuit capable of oscillating the vibrator 30, and circuits of various configurations are used. FIG. 11 is a circuit diagram illustrating, as an example of a circuit configuration, a configuration of a general inverter oscillation circuit.

The oscillation circuit 54 illustrated in FIG. 11 includes the circuit element 45, a feedback resistor Rf, a first limiting resistor R1, a second limiting resistor R2, a first capacitor Cg, a second capacitor Cd, and a third capacitor C3.

The circuit element 45 is an inverter integrated circuit (IC). A terminal X1 and a terminal X2 of the circuit element 45 are each a terminal coupled to an inverter. A terminal GND is coupled to a ground potential, and a terminal Vcc is coupled to a power supply potential. A terminal Y is a terminal for oscillation output.

The first capacitor Cg is coupled between the terminal X1 and the ground potential. Further, the first limiting resistor R1 and the second capacitor Cd coupled in series to each other are coupled in this order between the terminal X2 and the ground potential, from the terminal X2 side. Furthermore, one end of the feedback resistor Rf is coupled between the terminal X1 and the first capacitor Cg, and the other end of the feedback resistor Rf is coupled between the terminal X2 and the first limiting resistor R1.

Further, one end of the second limiting resistor R2 is coupled between the first limiting resistor R1 and the second capacitor Cd. Furthermore, the vibrator 30 described above is coupled between the first capacitor Cg and the feedback resistor Rf, and the other end of the second limiting resistor R2. That is, the vibrator 30 is a signal source of the oscillation circuit 54.

Figure 12:
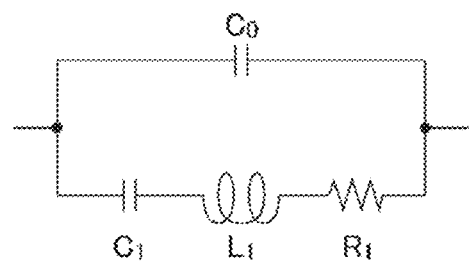
FIG. 12 is an example of an LCR equivalent circuit of the vibrator.

FIG. 12 is an example of an LCR equivalent circuit of the vibrator 30.

As illustrated in FIG. 12, the LCR equivalent circuit of the vibrator 30 is constituted by a series capacitor $C_1$, series inductor $L_1$, an equivalent series resistor $R_1$, and a parallel capacitor $C_0$.

In the oscillation circuit 54 illustrated in FIG. 11, given $C_g$ as the capacity of the first capacitor Cg and $C_d$ as the capacity of the second capacitor Cd, a load capacity $C_L$ is given by the following equation (a).

Mathematical Equation 1

$$C_L = \frac{C_d C_g}{C_d + C_g} \quad (a)$$

Then, an oscillation frequency $f_{osc}$ output from the terminal Y of the oscillation circuit 54 is given by equation (b) below.

Mathematical Equation 2

$$f_{osc} = f_Q \sqrt{1 + \frac{C_1}{C_0 + C_L}} \quad (b)$$

$f_Q$ is a natural frequency of the vibrator 30.

According to equation (b) described above, it can be seen that the oscillation frequency $f_{osc}$ of the signal output from the terminal Y can be finely adjusted by appropriately changing the load capacity $C_L$.

Further, a difference $\Delta f$ between the natural frequency $f_Q$ of the vibrator 30 and the oscillation frequency $f_{osc}$ of the oscillation circuit 54 is given by the following equation (c).

Mathematical Equation 3

$$\Delta f = f_{osc} - f_Q = f_Q \left( \sqrt{1 + \frac{C_1}{C_0 + C_L}} - 1 \right) \quad (c)$$

Here, since $C_1 \ll C_0$ and $C_1 \ll C_L$, $\Delta f$ is approximately given by equation (d) below.

Mathematical Equation 4

$$\Delta f = f_{osc} - f_Q \cong \frac{C_1}{2(C_0 + C_L)} f_Q \quad (d)$$

Accordingly, the oscillation frequency $f_{osc}$ of the oscillation circuit 54 is a value corresponding to the natural frequency $f_Q$ of the vibrator 30.

When the vibrator 30 is fixed to the container 70, for example, the natural frequency $f_Q$ fluctuates when the vibrator 30 is subjected to expansion stress due to temperature via a fixing portion. Further, when inclined, the vibrator 30 is affected by gravity due to self-weight and the like, causing the natural frequency $f_Q$ to fluctuate.

In the oscillation circuit 54, even in a case in which the natural frequency $f_Q$ fluctuates for such a reason, the oscillation frequency $f_{osc}$ changes on the basis of equation (d) described above so as to interlock with the fluctuation. That is, the oscillation frequency $f_{osc}$ is a value continually offset from the natural frequency $f_Q$ by $\Delta f$. As a result, the vibrator 30 can stably acquire a displacement amplitude $L_0$. As long as the displacement amplitude $L_0$ can be stabilized, the modulation characteristics of the optical modulator 12 can be stabilized, making it possible to increase the demodulation accuracy of the sample signal in the demodulation circuit 52.

As an example, preferably $\Delta f = f_{osc} - f_Q \leq 600$ [Hz], and more preferably 240 [Hz] $\leq \Delta f$ 450 [Hz].

Note that a signal generator such as, for example, a function generator may be used instead of the oscillation circuit 54.

4. Demodulation Circuit

The demodulation circuit 52 performs demodulation processing that demodulates the sample signal derived from the measured object 14 from a light-receiving signal output from the photoreceptor 10. The sample signal includes phase information and frequency information, for example. Then, displacement information of the measured object 14 can be acquired from the phase information, and velocity information of the measured object 14 can be acquired from the frequency information. As long as the different information can be thus acquired, the laser interferometer 1 can function as a displacement meter or a speedometer, making it possible to achieve higher functionality of the laser interferometer 1.

The demodulation circuit 52 is set with a circuit configuration in accordance with the modulation processing method. In the laser interferometer 1 according to this exemplary embodiment, the optical modulator 12 including the vibrator 30 is used. The vibrator 30 is an element in simple harmonic motion, and thus the vibration velocity changes constantly. As a result, the modulation frequency also changes with time, and thus a demodulation circuit in the related art cannot be used as is.

A demodulation circuit in the related art refers to a circuit that demodulates a sample signal from a light-receiving signal including a modulated signal modulated using an acoustic optical modulator (AOM). In the acoustic optical modulator, the modulation frequency does not change. Thus, while a demodulation circuit in the related art can demodulate a sample signal from a light-receiving signal including a modulated signal modulated by an optical modulator in which the modulation frequency does not change, the demodulation circuit cannot demodulate the sample signal as is in a case in which the light-receiving signal includes a modulated signal modulated by the optical modulator 12 in which the modulation frequency does change.

Therefore, the demodulation circuit 52 illustrated in FIG. 1 includes a preprocessing unit 53 and a demodulation processing unit 55. The light-receiving signal output from the photoreceptor 10 is first passed through the preprocessing unit 53, and then guided to the demodulation processing unit 55. The preprocessing unit 53 performs preprocessing on the light-receiving signal. With this preprocessing, a signal that can be demodulated in a demodulation circuit in the related art is acquired. Accordingly, the demodulation processing unit 55 demodulates the sample signal derived from the measured object 14 by a known demodulation method.

4.1 Preprocessing Unit

The preprocessing unit 53 illustrated in FIG. 1 includes a first band pass filter 534, a second band pass filter 535, a first delay adjuster 536, a second delay adjuster 537, a multiplier 538, a third band pass filter 539, a first signal amplitude detector 540, a second signal amplitude detector 541, a reference signal amplitude detector 542, an AGC unit 543, a value B calculator 544, an adder 546, and a signal waveform detector 547. Note that AGC refers to automatic gain control.

Further, a current-voltage converter 531 and an analog-digital converter (ADC) 532 are coupled in this order between the photoreceptor 10 and the preprocessing unit 53, from the photoreceptor 10 side. The current-voltage converter 531 is a transimpedance amplifier, and converts the current output from the photoreceptor 10 into a voltage signal. The ADC 532 is an analog-digital converter and converts an analog signal into a digital signal with a predetermined number of sampling bits.

The current output from the photoreceptor 10 is converted to a voltage signal by the current-voltage converter 531. The voltage signal is converted to a digital signal by the ADC 532, and divided into the two signals of a first signal S1 and a second signal S2 at a branching portion jp1. In FIG. 1, a path of the first signal S1 is referred to as a first signal path ps1, and a path of the second signal S2 is referred to as a second signal path ps2.

Furthermore, an ADC 533 is coupled between the oscillation circuit 54 and the second delay adjuster 537. The ADC 533 is an analog-digital converter and converts the analog signal into a digital signal with a predetermined number of sampling bits.

The first band pass filter 534, the second band pass filter 535, and the third band pass filter 539 are each a filter that selectively transmits signals in a specific frequency band.

The first delay adjuster 536 and the second delay adjuster 537 are each a circuit that adjusts the delay of a signal. The multiplier 538 is a circuit that generates an output signal proportional to the product of two input signals.

The first signal amplitude detector 540 is a circuit that detects the amplitude of the first signal S1 output from the first delay adjuster 536.

The second signal amplitude detector 541 is a circuit that detects the amplitude of the second signal S2 output from the third band pass filter 539.

The reference signal amplitude detector 542 is a circuit that detects the amplitude of the reference signal Ss output from the second delay adjuster 537.

The AGC unit 543 adjusts the amplitude of the second signal S2 on the basis of the amplitude of the reference signal Ss and the AGC coefficient. As a result, the amplitude of the first signal S1 and the amplitude of the second signal S2 can be aligned.

The value B calculator 544 calculates and records a value B from the parameters used in calculating the AGC coefficient. The value B is a phase shift of the modulated signal, as described below.

The adder 546 is a circuit that generates an output signal proportional to the sum of the two input signals.

The signal waveform detector 547 is a circuit that detects a waveform of the signal output from the adder 546 and outputs the detection result to the control unit 57.

Next, the operation of the preprocessing unit 53 will be described along the flow of the first signal S1, the second signal S2, and the reference signal Ss.

The first signal S1 passes through the first band pass filter 534 disposed on the first signal path ps1, and is subsequently adjusted in group delay by the first delay adjuster 536. The group delay adjusted by the first delay adjuster 536 corresponds to the group delay of the second signal S2 by the second band pass filter 535 described below. By this delay adjustment, delay times associated with filter circuit passage can be made uniform between the first band pass filter 534 through which the first signal S1 passes and the second band pass filter 535 and the third band pass filter 539 through which the second signal S2 passes. The first signal S1 passing through the first delay adjuster 536 is divided into two signals, one being input to the first signal amplitude detector 540 and the other being input to the adder 546. The first signal amplitude detector 540, in AGC coefficient recording mode described below, detects an amplitude V1 of the first signal S1. The detected amplitude V1 is input to the AGC unit 543 and the value B calculator 544.

The second signal S2 is passed through the second band pass filter 535 disposed on the second signal path ps2 and subsequently input to the multiplier 538. In the multiplier 538, the second signal S2 is multiplied by the reference signal Ss output from the second delay adjuster 537. Specifically, the reference signal Ss represented by $\cos(\omega_m t)$ output from the oscillation circuit 54 is digitally converted by the ADC 533, adjusted in phase by the second delay adjuster 537, and output to the multiplier 538. $\omega_m$ is an angular frequency of the modulated signal of the optical modulator 12, and t is time. Subsequently, the second signal S2 is passed through the third band pass filter 539 and divided into two signals, one being input to the second signal amplitude detector 541, and the other being input to the AGC unit 543. The second signal amplitude detector 541, in AGC coefficient recording mode described below, detects an amplitude V2 of the second signal S2. The detected amplitude V2 is input to the AGC unit 543 and the value B calculator 544.

The reference signal Ss is passed through the ADC 533 and the second delay adjuster 537 and subsequently input to the reference signal amplitude detector 542. The reference signal amplitude detector 542, in AGC coefficient recording mode described below, detects an amplitude Vq of the reference signal Ss. The detected amplitude Vq is input to the AGC unit 543 and the value B calculator 544.

The AGC unit 543, in AGC coefficient recording mode, calculates and records the AGC coefficient on the basis of the amplitude V1 of the first signal S1, the amplitude V2 of the second signal S2, and the amplitude Vq of the reference signal Ss. Further, in measurement mode, the AGC unit 543 adjusts the amplitude of the second signal S2 on the basis of the recorded AGC coefficient and the newly detected amplitude of the second signal S2 and amplitude of the reference signal Ss. Then, the second signal S2 after amplitude adjustment is input to the adder 546. Note that, in this exemplary embodiment, the AGC unit 543 is configured to adjust only the amplitude of the second signal S2, but the AGC unit 543 may be configured to adjust only the amplitude of the first signal S1 or may be configured to adjust the amplitudes of both signals. Further, the second signal S2 may be configured to pass through the first signal path ps1 and the first signal S1 may be configured to pass through the second signal path ps2.

The value B calculator 544, calculates the value B on the basis of the amplitude V1 of the first signal S1, the amplitude V2 of the second signal S2, and the amplitude Vq of the reference signal Ss detected in AGC coefficient recording mode. With calculation of the value B, the displacement amplitude of the optical modulator 12 can be calculated. Therefore, by monitoring the value B, it is possible to continually monitor the displacement amplitude of the optical modulator 12 and detect the presence or absence of an abnormality.

The adder 546 outputs an output signal proportional to the sum of the first signal S1 and the second signal S2 to the demodulation processing unit 55.

4.2 Basic Principle of Preprocessing Unit

Next, the basic principle of the preprocessing in the preprocessing unit 53 will be described. Note that the basic principle referred to here is the principle described in JP-A-2-38889. Further, in this basic principle, a system in which the frequency changes in a sinusoidal shape as a modulated signal and the displacement of the measured object also changes in simple harmonic motion in an optical axis direction is considered. Given $E_m$, $E_d$, $\varphi$ as Mathematical Equation 5

$$E_m a_m \{\cos(\omega_g t + B \sin \omega_m t + \varphi_m) + i \sin(\omega_0 t + B \sin \omega_m t + \varphi_m)\} \quad (1)$$

$$E_d a_d \{\cos(\omega_g t + A \sin \omega_d t + \varphi_d) + i \sin(\omega_0 t + A \sin \omega_g t + \varphi_d)\} \quad (2)$$

$$\varphi = \varphi_m - \varphi_d \quad (3)$$

a light-receiving signal intensity $I_{PD}$ output from the photoreceptor 10 is theoretically expressed by the following equation.

Mathematical Equation 6

$$\begin{aligned} I_{PO} &= \langle |E_m + E_d|^2 \rangle \\ &= \langle |E_m^2 + E_d^2 + 2E_m E_d| \rangle \\ &= a_m^2 + a_d^2 + 2a_m a_d (B \sin \omega_m t - A \sin \omega_d t + \varphi) \end{aligned} \quad (4)$$

Note that $E_m$, $E_d$, $\varphi_m$, $\varphi_d$, $\varphi$, $\omega_m$, $\omega_d$, $\omega_0$, $a_m$, $a_d$ are as follows.

Mathematical Equation 7

$E_m$: ELECTRIC FIELD COMPONENT OF MODULATION SIGNAL
$E_d$: ELECTRIC FIELD COMPONENT OF SAMPLE SIGNAL DERIVED FROM MEASURED OBJECT
$\varphi_m$: INITIAL PHASE VALUE OF OPTICAL PATH 20
$\varphi_d$: INITIAL PHASE VALUE OF OPTICAL PATH 22
$\varphi$: OPTICAL PATH PHASE DIFFERENCE OF LASER INTERFEROMETER
$\omega_m$: ANGULAR FREQUENCY OF MODULATION SIGNAL DERIVED FROM OPTICAL MODULATOR
$\omega_d$: ANGULAR FREQUENCY OF SAMPLE SIGNAL DERIVED FROM MEASURED OBJECT
$\omega_g$: ANGULAR FREQUENCY OF EMITTED LIGHT EMITTED FROM POWER SOURCE UNIT
$a_m$: COEFFICIENT
$a_d$: COEFFICIENT Further, in equation (4), < > represents the time average.

The first term and second term of equation (4) described above represent direct current components, and the third term represents an alternating current component. Given $I_{PD\_AC}$ as this alternating current component, $I_{PD\_AC}$ is expressed by the following equation.

Mathematical Equation 8

$$\begin{aligned} I_{POAC} &= 2a_m a_d (B \sin \omega_m t - A \sin \omega_d t + \varphi) \\ &= 2a_m a_d \{\cos(B \sin \omega_m t) \cos(A \sin \omega_d t - \varphi) + \\ &\quad \sin(B \sin \omega_m t) \sin(A \sin \omega_d t - \varphi)\} \end{aligned} \quad (5)$$

$$A = \frac{f_{dmax}}{f_d} \quad (6)$$

$$B = \frac{f_{mmax}}{f_m} \quad (7)$$

$f_{dmax}$: DOPPLER FREQUENCY SHIFT OF SAMPLE SIGNAL
$f_d$: FREQUENCY OF SAMPLE SIGNAL
$f_{mmax}$: DOPPLER FREQUENCY SHIFT OF MODULATION SIGNAL
$f_m$: FREQUENCY OF MODULATION SIGNAL Here, ν-order Bessel functions such as the following equations are known.

Mathematical Equation 9

$$\cos\{\zeta \sin(2\pi f_v t)\} = J_0(\zeta) + 2J_2(\zeta) \cos(2 \cdot 2\pi f_v t) + 2J_4(\zeta) \cos(4 \cdot 2\pi f_v t) + \ldots \quad (8)$$

$$\sin\{\zeta \sin(2\pi f_v t)\} = 2J_2(\zeta) \sin(1 \cdot \pi f_v t) + 2J_3(\zeta) \sin(3 \cdot 2 f_v t) + \ldots \quad (9)$$

When equation (5) described above is series-expanded using the Bessel functions of equation (8) and equation (9) described above, the equation can be transformed as follows.

Mathematical Equation 10

$$J_{PD.AC}=2a_m a_d\{[J_0(B)+2J_2(B)\cos(2\cdot\omega_m t)+2J_4(B)\cos(4\cdot\omega_m t)+\ldots]\cos(A\sin\omega_d t-\phi)-[2J_1(B)\sin(1\cdot\omega_m t)+2J_3(B)\sin(3\cdot\omega_m t)+\ldots]\sin(A\sin\omega_d t-\phi)]$$ (10)

Here, $J_0(B)$, $J_1(B)$, $J_2(B)$, ... are each a Bessel coefficient.

When the equation is expanded as described above, it can be said that theoretically it is possible to extract the frequency band corresponding to a specific order by a band pass filter.

Therefore, in the preprocessing unit 53 described above, the light-receiving signal is preprocessed using the following flow on the basis of this theory.

First, the light-receiving signal output from the ADC 532 described above is divided into the two signals of the first signal S1 and the second signal S2 at the branching portion jp1. The first signal S1 is passed through the first band pass filter 534. The center angular frequency of the first band pass filter 534 is set to $\omega_m$. As a result, the first signal S1 after passing through the first band pass filter 534 is expressed by the following equation.

Mathematical Equation 11

$$J_{poss1}=J_1(B)[-\cos(\omega_m t+A\sin\omega_d t-\phi)+\cos(\omega_m t-A\sin\omega_d t+\phi)]=-2J_1(B)\sin(\omega_m t)\sin(A\sin\omega_d t-\phi)$$ (11)

On the other hand, the second signal S2 is passed through the second band pass filter 535. The center angular frequency of the second band pass filter 535 is set to a value different from that of the center angular frequency of the first band pass filter 534. Here, as an example, the center angular frequency of the second band pass filter 535 is set to $2\omega_m$. As a result, the second signal S2 after passing through the second band pass filter 535 is represented by the following equation.

Mathematical Equation 12

$$J_{BPF2}=J_2(B)\cos(2\cdot\omega_m t)\cdot\cos(A\sin\omega_d t-\phi)=\tfrac{1}{2}J_2(B)\{\cos(2\cdot\omega_m t+\cos(A\sin\omega_d t-\phi))+\cos(2\cdot\omega_m t-\cos(A\sin\omega_d t-\phi))\}$$ (12)

The second signal S2 after passing through the second band pass filter 535 is multiplied by the reference signal Ss by the multiplier 538. The second signal S2 after multiplication is represented by the following equation.

Mathematical Equation 13

$$I_{\cos(\omega_m t)} = \frac{1}{2}f_2(B)\{\cos(2\cdot\omega_m t + A\sin\omega_d t - \phi) + \cos(2\cdot\omega_m t - A\sin\omega_d t + \phi)\}\cdot\cos(\omega_m t)$$
$$= \frac{1}{2}f_2(B)\{\cos(3\cdot\omega_m t + A\sin\omega_d t - \phi) + \cos(1\cdot\omega_m t + A\sin\omega_d t - \phi) + \cos(3\cdot\omega_m t - A\sin\omega_d t + \phi) + \cos(1\cdot\omega_m t - A\sin\omega_d t + \phi)\}$$ (13)

The second signal S2 after passing through the multiplier 538 is passed through the third band pass filter 539. The center angular frequency of the third band pass filter 539 is set to the same value as that of the center angular frequency of the first band pass filter 534. Here, as an example, the center angular frequency of the third band pass filter 539 is set to $\omega m$. As a result, the second signal S2 after passing through the third band pass filter 539 is represented by the following equation.

Mathematical Equation 14

$$J_{pass2}=\tfrac{1}{2}J_2(B)\{\cos(\omega_m t-A\sin\omega_d t-\phi)+\cos(\omega_m t-A\sin\omega_d t+\phi)\}=J_2(B)\cos(\omega_m t)\cos(A\sin\omega_d t-\phi)$$ (14)

Subsequently, the phase of the first signal S1 represented by equation (11) described above is adjusted by the first delay adjuster 536.

Further, the amplitude of the second signal S2 represented by equation (14) described above is also adjusted by the AGC unit 543, and aligned with the amplitude of the first signal S1.

Then, the first signal S1 and the second signal S2 are added by the adder 546. The addition result is represented by the following equation.

Mathematical Equation 15

$$J_{S3}=\cos(\omega_m t+A\sin\omega_d t-\phi)$$ (15)

As in equation (15) described above, as a result of the addition, unnecessary terms are eliminated, making it possible to extract necessary terms. This result is output to the demodulation processing unit 55.

4.3 Configuration of Demodulation Processing Unit

The demodulation processing unit 55 performs demodulation processing that demodulates information derived from the measured object 14 from the signal output from the preprocessing unit 53. The demodulation processing is not particularly limited, and examples include known orthogonal detection methods. An orthogonal detection method is a method of conducting demodulation processing on an input signal by performing an operation of externally mixing signals orthogonal to each other.

The demodulation processing unit 55 illustrated in FIG. 1 is a digital circuit including a multiplier 551, a multiplier 552, a phase shifter 553, a first low-pass filter 555, a second low-pass filter 556, a divider 557, an arc tangent calculator 558, an output circuit 559, and a phase waveform detector 560.

4.4 Principle of Demodulation Processing by Demodulation Processing Unit

In the demodulation processing, the signal output from the preprocessing unit 53 is first divided into two. The multiplier 551 multiplies one signal after the division by the reference signal Ss output from the oscillation circuit 54 and represented by $\cos(\omega_m t)$. The multiplier 552 multiplies the other signal after the division by a signal represented by $-\sin(\omega_m t)$ and obtained by shifting the phase of the reference signal Ss output from the oscillation circuit 54 by $-90°$. The reference signal Ss and the signal obtained by shifting the movement of the reference signal Ss are signals phase-shifted by 90° from each other.

The signal passing through the multiplier 551 is passed through the first low-pass filter 555 and subsequently input to the divider 557 as a signal x. The signal passing through the multiplier 552 is passed through the second low-pass filter 556 and subsequently input to the divider 557 as a signal y. The divider 557 divides the signal y by the signal x, passes the output y/x through the arc tangent calculator 558, and determines the output atan(y/x).

Subsequently, the output atan(y/x) is passed through the output circuit 559, and thus a phase $\varphi_d$ is determined as information derived from the measured object 14. In the output circuit 559, phase unwrapping is performed to connect phases when there is a phase jump of $2\pi$ at adjacent points. Displacement information of the measured object 14 can be calculated from the phase information output from the demodulation processing unit 55. As a result, a displacement meter that measures the displacement of the measured object 14 is realized. Further, the velocity information can be determined from the displacement information. As a result, a speedometer for measuring the velocity of the measured object 14 is achieved.

While the circuit configuration of the demodulation processing unit 55 has been described above, the circuit configuration of the digital circuit described above is an example and the configuration is not limited thereto. Further, the demodulation processing unit 55 is not limited to a digital circuit, and may be an analog circuit. The analog circuit may include a frequency-voltage converter circuit or a Δ counter circuit.

Further, in the circuit configuration of the demodulation processing unit 55 described above, frequency information derived from the measured object 14 may be required. The velocity information of the measured object 14 can be calculated on the basis of the frequency information.

4.5 Demodulation-Possible Condition

Here, according to the basic principle of the preprocessing unit 53 described above, the amplitude of the second signal S2 is aligned with the amplitude of the first signal S1 in the AGC unit 543. That is, it is necessary to align coefficient $-2J_1(B)$ included in equation (11) and coefficient $J_2(B)$ included in equation (14). The $J_1(B)$ and $J_2(B)$ included in these coefficients are the Bessel coefficients described above, but the value B therein is, as described above, the phase shift of the modulated signal and, specifically, the ratio of the Doppler frequency shift of the modulated signal to the frequency of the modulated signal. On the other hand, the value A included in equation (11) and equation (14) is the phase shift of the sample signal and, specifically, the ratio of the Doppler frequency shift of the sample signal to the frequency of the sample signal. The value B is determined by the setting of the optical system 50 and, if the setting is the same, the value is, in principle, a constant value. For such reasons, the AGC unit 543, in AGC coefficient recording mode, calculates the "AGC coefficient" including the $J_1(B)$ and $J_2(B)$ ratio on the basis of the amplitude V1 of the first signal S1, the amplitude V2 of the second signal S2, and the amplitude Vq of the reference signal Ss. Then, in measurement mode, the AGC unit 543 can align the amplitude of the second signal S2 with the amplitude of the first signal S1 on the basis of the AGC coefficient.

Nevertheless, such an amplitude adjustment is possible only in a case in which the portion other than the coefficient $-2J_1(B)$ in equation (11) and the portion other than the coefficient $J_2(B)$ in equation (14) each periodically fluctuate within a range of a maximum value of 1 and a minimum value of $-1$. The portion other than the coefficient $-2J_1(B)$ in equation (11) is represented by equation (16) below. The portion other than the coefficient $J_2(B)$ in equation (14) is represented by equation (17) below.

Mathematical Equation 16

$$J_{pass1} = \sin(\omega_m t)\sin(A \sin \omega_d t \ldots \phi) \quad (16)$$

$$J_{pass2} = \cos(\omega_m t)\cos(A \sin \omega_d t \ldots \phi) \quad (17)$$

Accordingly, to allow adjustment of the amplitude in the AGC unit 543, it is necessary to satisfy the condition that equation (16) and equation (17) each periodically fluctuate within the range of a maximum value of 1 and a minimum value of $-1$.

Here, the angular frequency $\omega_m$ of the modulated signal is sufficiently large compared to an angular frequency $\omega_d$ of the sample signal, and $\omega_m \gg \omega_d$ is satisfied. Accordingly, in order to satisfy the condition described above, the condition arises that, in equation (16), the maximum value of the absolute value of $\sin(A \sin \omega_d t - \phi)$ is 1 and, in equation (17), the maximum value of the absolute value of $\cos(A \sin \omega_d t - \phi)$ is 1. With this condition satisfied, preprocessing by the preprocessing unit 53 is possible, and ultimately demodulation processing by the demodulation processing unit 55 is possible. Accordingly, this condition is referred to as the "demodulation-possible condition".

In summary, satisfaction of both equation (18) and equation (19) below is the demodulation-possible condition.

Mathematical Equation 17

$$\max[|\sin(A \sin \omega_d t - \phi)|] = 1 \quad (18)$$

$$\max[|\cos(A \sin \omega_d t - \phi)|] = 1 \quad (19)$$

To satisfy this demodulation-possible condition, a range of values of $A \sin \omega_d t - \phi$ needs to be $\pi$ or greater. Here, the optical path phase difference $\phi$ cannot usually take any desired value. Then, in order for the range of the values of $A \sin \omega_d t - \phi$ to be greater than or equal to $\pi$, the following equation is required for value A in particular.

Mathematical Equation 18

$$A = \frac{f_{dmax}}{f_d} \geq \frac{\pi}{2} \quad (20)$$

On the other hand, in a case in which equation (20) is not satisfied, then the demodulation-possible condition cannot be satisfied. Therefore, in this exemplary embodiment, the standard sample 17, separate from the measured object 14, is used to allow adjustment of the amplitude of the second signal S2 in the AGC unit 543 regardless of the condition of equation (20). Specifically, a mechanism for receiving the standard object light L4 from the standard sample 17 is provided, and the ratio of $J_1(B)$ to $J_2(B)$ described above is determined from the standard object light L4. For the standard sample 17, a sample satisfying the condition of equation (20) is selected. Thus, regardless of the state of the measured object 14, the AGC coefficient required for activation of the AGC unit 543 can be determined. Then, in measurement mode, by using the calculated AGC coefficient, it is possible to determine the phase information and the frequency information derived from the measured object 14 regardless of the measured object 14, and determine the displacement information and velocity information of the measured object 14.

4.6 Operating Principle of AGC Unit

Next, the principle under which the AGC unit 543 operates will be described.

The AGC coefficient $C_{AGC}$ is a coefficient for aligning the amplitude of the second signal S2 with the amplitude of the first signal S1 on the basis of on the basic principle described above, and thus is represented by equation (21) below.

Mathematical Equation 19

$$C_{AGC} = \frac{2 \times J_1(B)}{J_2(B)} \cdot \frac{1}{V_q} \quad (21)$$

Here, Vq is the amplitude of the reference signal Ss.

This AGC coefficient $C_{AGC}$ can be calculated from the ratio of the amplitude V1 of the first signal S1 to the amplitude V2 of the second signal S2 obtained by dividing the light-receiving signal of the standard object light L4. Specifically, a relationship represented by equation (22) below is established between the amplitude V1 and the amplitude V2 and the AGC coefficient $C_{AGC}$.

Mathematical Equation 20

$$C_{AGC} = \frac{V2}{V1} = \frac{2 \times J_1(B)}{J_2(B)} \cdot \frac{1}{V_q} \quad (22)$$

The AGC coefficient $C_{AGC}$ can be determined as described above. Then, in measurement mode described below, the amplitude of the second signal S2 can be aligned with the amplitude of the first signal S1 in the AGC unit 543 by using the calculated AGC coefficient $C_{AGC}$. As a result, the demodulation processing in the demodulation circuit 52 is possible even in a case in which equation (20) described above is not satisfied.

4.7. Operation Modes of Laser Interferometer

The operation modes of the laser interferometer 1 include AGC coefficient recording mode and measurement mode, as described above. These are described sequentially below.

4.7.1 AGC Coefficient Recording Mode 4.7.1.1 Calculation and Recording of AGC Coefficient The control unit 57 of the laser interferometer 1, upon selection of AGC coefficient recording mode, controls the operation of the optical path switching unit 15, positioning the optical path changing element 153 in the first position P1. When the optical path changing element 153 is disposed in the first position P1, the emitted light L1 is incident on the standard sample 17, and the standard object light L4 is generated. When the standard object light L4 is received by the photoreceptor 10, the amplitude V1 of the first signal S1 is acquired by the first signal amplitude detector 540, and the amplitude V2 of the second signal S2 is acquired by the second signal amplitude detector 541. Further, the amplitude Vq of the reference signal Ss is acquired by the reference signal amplitude detector 542. The AGC unit 543 calculates and records the AGC coefficient $C_{AGC}$ on the basis of these parameters.

The standard sample 17 satisfies the condition of equation (20) described above for the phase shift of the standard sample signal, specifically the value A, which is the ratio of the Doppler frequency shift of the standard sample signal to the frequency of the standard sample signal. The standard sample 17 is preferably a reflector in simple harmonic motion along the optical path 23. Therefore, in a case in which equation (20) described above is applied to the standard sample 17, the equation can be transformed into equation (23).

Mathematical Equation 21

$$A = \frac{f_{amax}}{f_a} = \frac{4\pi L_a}{\lambda} \geq \frac{\pi}{2} \quad (23)$$

In equation (23), famax is the Doppler frequency shift of the standard sample signal derived from the standard sample 17, fa is the frequency of the standard sample signal, La is the displacement amount of the standard sample 17 along the optical path 23, and λ is the wavelength of the emitted light L1. The displacement amount La required for the standard sample 17 from equation (23) is represented by equation (24).

Mathematical Equation 22

$$L_a \geq \frac{\lambda}{8} \quad (24)$$

From equation (24), in the standard sample 17, the displacement amount La along the optical path 23 is preferably at least ⅛ of the wavelength λ of the emitted light L1. With use of the standard sample 17 that satisfies such a condition, the amplitude V1 of the first signal S1 and the amplitude V2 of the second signal S2 can be determined in a state of satisfaction of the condition of equation (23) in AGC coefficient recording mode. As a result, in AGC coefficient recording mode, the correct AGC coefficient $C_{AGC}$ can be theoretically determined. Note that, as long as the displacement amount La satisfies such a condition, the standard sample 17 does not necessarily have to reciprocatively vibrate. That is, the standard sample 17 may be a device configured to move in one direction by the displacement amount La or greater.

The standard sample 17 is a reflector including a light-reflecting surface that reflects the emitted light L1, as described above. The standard sample 17 may be a device that vibrates in plane, that is, is displaced parallel to the light-reflecting surface, but is preferably a device that vibrates out-of-plane, that is, is displaced in an out-of-plane direction intersecting the light-reflecting surface. By use of such a device displaced in the out-of-plane direction, the displacement amount La along the optical path 23 can be efficiently secured.

Specific examples of the standard sample 17 include a piezoelectric element and an MEMS element.

Of these, the piezoelectric element is an element that utilizes the displacement by the inverse piezoelectric effect to vibrate the light-reflecting surface. Examples of the piezoelectric element include a crystal oscillator and a piezo actuator.

The crystal oscillator includes, for example, a vibration piece formed of crystal, and a light-reflecting surface provided on the vibration piece. Then, due to the inverse piezoelectric effect exhibited by the crystal, the vibration piece vibrates by flexing in a thickness direction, for example. On the basis of this vibration by flexing, the light-reflecting surface that reflects the emitted light L1 reciprocatively vibrates along the optical path 23. As a result, the standard object light L4 is generated.

Note that, as the vibration piece, a tuning fork type vibration piece having a resonance frequency of 32 kHz in the vibration by flexing mode is preferably used in consideration of vibration stability and the like. With such a tuning fork type crystal vibration piece, even if the voltage applied to the vibration piece is about 3 V, for example, it is possible to secure the displacement amount La of 1 μm or greater. Therefore, especially considering that the standard sample 17 can be driven at a low voltage and self-oscillation is possible, the standard sample 17 can be made smaller and power consumption can be reduced.

The piezo actuator includes a piezoelectric body, an electrode layer provided on the piezoelectric body, and a light-reflecting surface. Examples of the piezoelectric material constituting the piezoelectric body include piezoelectric ceramics such as lead zirconate titanate (PZT), barium titanate, and lead titanate, and piezoelectric plastics such as polyvinylidene fluoride. The piezoelectric body vibrates by expanding and contracting, for example, when an alternating current electric field is applied. On the basis of this vibration by expanding and contracting, the light-reflecting surface that reflects the emitted light L1 reciprocatively vibrates along the optical path 23. As a result, the standard object light L4 is generated.

For example, in the case of a layered piezo actuator, when an alternating current voltage of about 7 V is applied to the piezoelectric body at a frequency of 10 kHz, an element exists that can secure the displacement amount La that satisfies the condition of equation (24) described above for the emitted light L1 having a wavelength of 850 nm.

On the other hand, examples of MEMS elements include a silicon oscillator and an MEMS vibrating mirror element. Note that MEMS is an abbreviation for micro-electromechanical systems.

The silicon oscillator includes, for example, a vibration piece formed of silicon, a piezoelectric layer and an electrode layer provided on the vibration piece, and a light-reflecting surface provided on the vibration piece. The piezoelectric layer, by application of an alternating current electric field, causes the vibration piece to vibrate by flexing, for example. On the basis of this vibration by flexing, the light-reflecting surface that reflects the emitted light L1 reciprocatively vibrates along the optical path 23. As a result, the standard object light L4 is generated.

The MEMS vibrating mirror element includes, for example, a pair of torsion bars, a movable unit suspended between the torsion bars, and a light-reflecting surface provided on the movable unit. The movable unit is formed along with the torsion bars by using MEMS technology. Then, the movable unit reciprocatively vibrates by rotating about the rotation axis with the torsion bar serving as the rotation axis. On the basis of this reciprocative vibration by rotation, the light-reflecting surface that reflects the emitted light L1 reciprocatively vibrates along the optical path 23. As a result, the standard object light L4 is generated. Note that examples of the method for driving the movable unit include an electromagnetic driving method, an electrostatic driving method, and a piezoelectric driving method.

As described above, a piezoelectric element or an MEMS element is preferably used for the standard sample 17 (reflector). These elements are capable of self-oscillation due to a high Q value, and thus the elements exhibit highly accurate vibration characteristics even with a simple oscillation mechanism that uses an oscillation circuit. Therefore, use of these elements as the standard sample 17 makes it possible to find a more accurate AGC coefficient $C_{AGC}$, and easily make the laser interferometer 1 smaller and lighter. Further, as long as the oscillation mechanism is simple, power consumption can be suppressed, making it possible to easily reduce the power consumption of the laser interferometer 1.

On the other hand, the standard sample 17 may be a structure other than the piezoelectric element and the MEMS element described above.

FIG. 13 to FIG. 16 are each a conceptual view illustrating an example of the standard sample 17.

Figure 13:
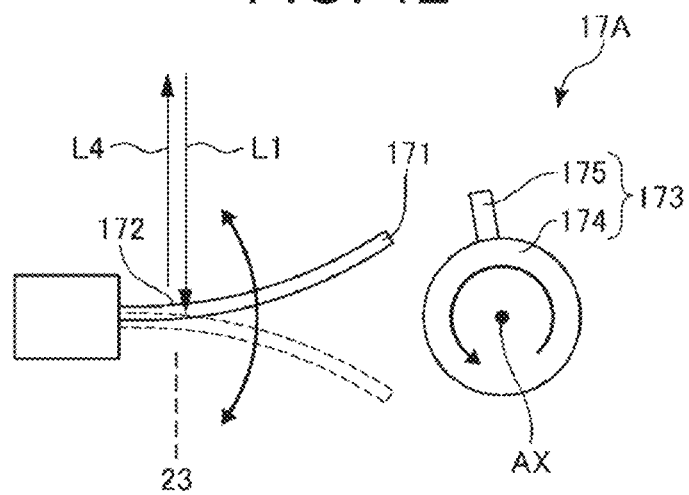
FIG. 13 is a conceptual view illustrating an example of a standard sample.

A standard sample 17A illustrated in FIG. 13 includes a cantilever beam 171, a light-reflecting surface 172 provided on the cantilever beam 171, and a driving portion 173 that drives the cantilever beam 171. The driving portion 173 includes, for example, a rotating portion 174 that rotates about a rotation axis Ax, and a protrusion portion 175 provided on the rotating portion 174. Each time the rotating portion 174 rotates once about the rotation axis Ax, the protrusion portion 175 hits the cantilever beam 171, imparting a flipping motion. As a result, the light-reflecting surface 172 reflects the emitted light L1 while reciprocatively vibrating along the optical path 23, generating the standard object light L4.

Figure 14:
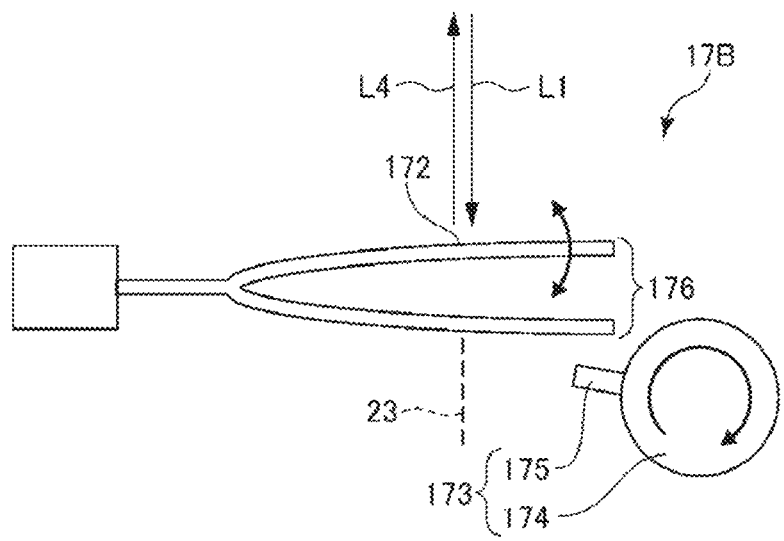
FIG. 14 is a conceptual view illustrating an example of the standard sample.

A standard sample 17B illustrated in FIG. 14 is similar to the standard sample 17A, except that the cantilever beam 171 illustrated in FIG. 13 is changed to a tuning fork type vibration piece 176.

Figure 15:
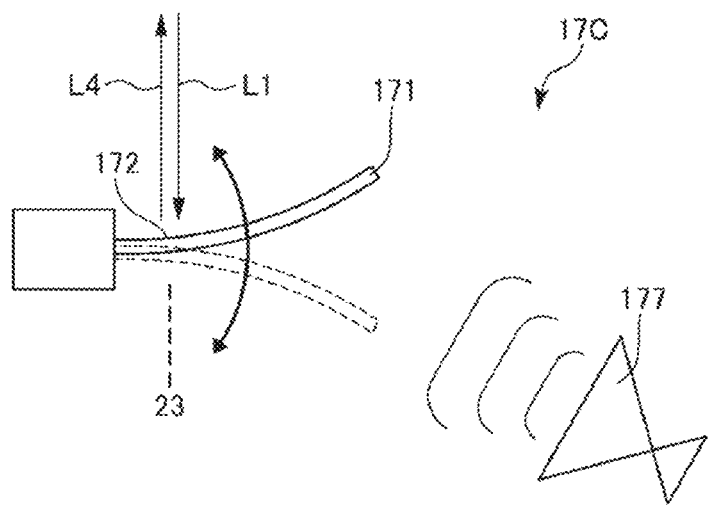
FIG. 15 is a conceptual view illustrating an example of the standard sample.

A standard sample 17C illustrated in FIG. 15 is similar to the standard sample 17A except that the driving portion 173 illustrated in FIG. 13 is changed to an exciter 177. Examples of the exciter 177 include an acoustic speaker. The acoustic speaker vibrates the cantilever 171 by generating sound waves toward the cantilever 171. As a result, the light-reflecting surface 172 reflects the emitted light L1 while reciprocatively moving along the optical path 23, generating the standard object light L4.

Figure 16:
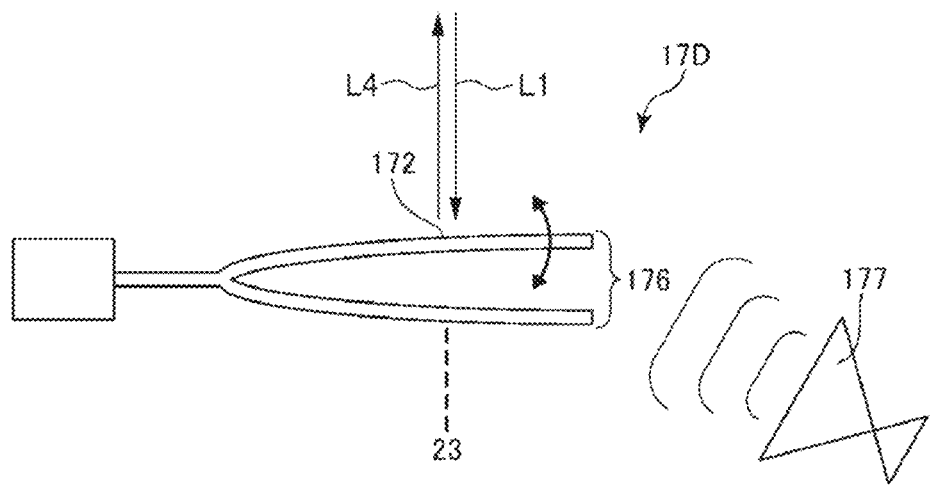
FIG. 16 is a conceptual view illustrating an example of the standard sample.

A standard sample 17D illustrated in FIG. 16 is similar to the standard sample 17C, except that the cantilever beam 171 illustrated in FIG. 15 is changed to the tuning fork type vibration piece 176.

As described above, the standard samples 17A, 17B include the driving portion 173 as a light-reflecting surface driving portion that moves the light-reflecting surface 172, and standard samples 17C, 17D include the exciter 177 as a light-reflecting surface driving portion that moves the light-reflecting surface 172.

According to such a configuration, even with a particularly simple configuration, the light-reflecting surface 172 can be reciprocatively vibrated along the optical path 23. As a result, the laser interferometer 1 can be easily made smaller and lighter and reduced in power consumption and in cost.

Further, in the standard sample 17, as described above, the light-reflecting surface 172 is configured to make simple harmonic motion along the optical path 23 (second optical path). Given λ as a wavelength of the emitted light L1 (first laser light), preferably the displacement amount La of the light-reflecting surface in simple harmonic motion satisfies La≥λ/8. As a result, the standard sample signal included in the standard object light L4 includes a signal of time exceeding one period of the simple harmonic motion. Thus, a more accurate AGC coefficient $C_{AGC}$ can be determined.

Note that whether the correct AGC coefficient $C_{AGC}$, that is, the AGC coefficient $C_{AGC}$ that makes it possible to perform demodulation processing with sufficient accuracy in the demodulation processing unit 55, was calculated can be verified from the waveform of the signal obtained by actually adjusting the second signal S2 using the AGC coefficient $C_{AGC}$ recorded in the AGC unit 543 and inputting that signal to the signal waveform detector 547.

Figure 17:
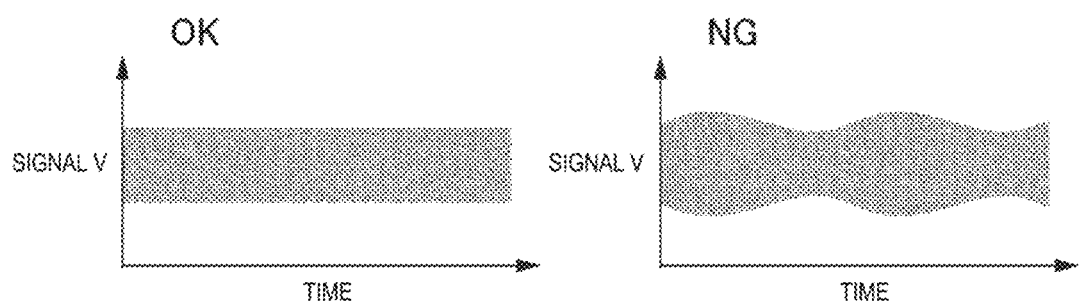
FIG. 17 is an example of a waveform for distinguishing whether a signal input to a signal waveform detector is a signal generated via amplitude adjustment using a correct AGC coefficient or a signal generated via amplitude adjustment using an unsuitable AGC coefficient.

FIG. 17 is an example of a waveform for distinguishing whether the signal input to the signal waveform detector 547 is a signal generated via amplitude adjustment using the correct AGC coefficient $C_{AGC}$ or a signal generated via amplitude adjustment using an unsuitable AGC coefficient $C_{AGC}$.

In a case in which the AGC unit 543 adjusts the amplitude using the correct AGC coefficient $C_{AGC}$, the waveform of the signal input to the signal waveform detector 547, that is, the vibration waveform representing the change over time of the input voltage, is a straight line in which the two envelopes are substantially parallel to each other, as indicated by OK in FIG. 17. In contrast, in a case in which the AGC unit 543 adjusts the amplitude using an unsuitable AGC coefficient $C_{AGC}$, the waveform of the signal input to the signal waveform detector 547 is a curve in which the two envelopes each have a wave-like shape, as indicated by NG in FIG. 17. The signal waveform detector 547 detects the shape of such envelopes and outputs the detection result to the control unit 57. The control unit 57 displays this detection result on the display unit 58, notifying the user of the acceptability of the AGC coefficient $C_{AGC}$. The user can then, for example, execute AGC coefficient recording mode again, or investigate the cause of the AGC coefficient $C_{AGC}$ being unacceptable.

Further, whether the correct AGC coefficient $C_{AGC}$ was calculated can be confirmed not only from the waveform of the signal input to the signal waveform detector 547, but also from the waveform of the phase output from the demodulation processing unit 55 and input to the phase waveform detector 560.

Figure 18:
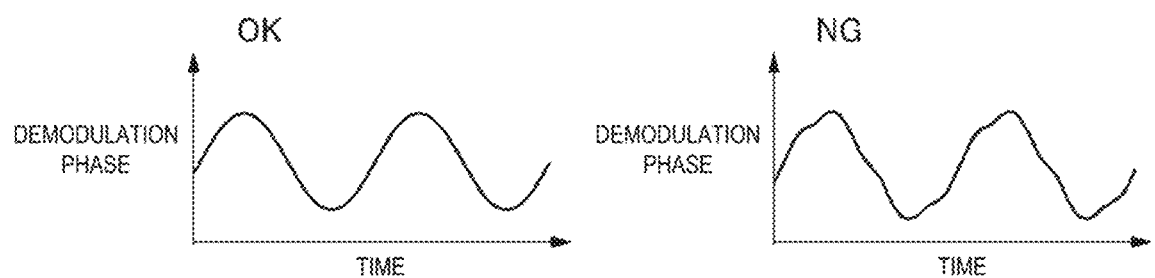
FIG. 18 is an example of a waveform for distinguishing whether a phase input to a phase waveform detector is a phase calculated via amplitude adjustment using the correct AGC coefficient or a phase calculated via amplitude adjustment using an unsuitable AGC coefficient.

FIG. 18 is an example of a waveform for distinguishing whether a phase input to the phase waveform detector 560 is a phase calculated via amplitude adjustment using the correct AGC coefficient $C_{AGC}$ or a phase calculated via amplitude adjustment using an unsuitable AGC coefficient $C_{AGC}$.

In a case in which the AGC unit 543 adjusts the amplitude using the correct AGC coefficient $C_{AGC}$, the waveform of the phase input to the phase waveform detector 560, that is, the waveform representing the change over time of the phase, is derived from the standard sample 17 and is, for example, a curve having a sinusoidal shape representing simple harmonic motion, as indicated by OK in FIG. 18. In contrast, in a case in which the AGC unit 543 adjusts the amplitude using an unsuitable AGC coefficient $C_{AGC}$, the waveform of the phase input to the phase waveform detector 560 is a curve not having a sinusoidal shape, as indicated by NG in FIG. 18. The phase waveform detector 560 detects the waveform of such a phase and outputs the detection result to the control unit 57. The control unit 57 displays this detection result on the display unit 58, notifying the user of the acceptability of the AGC coefficient $C_{AGC}$. The user can then, for example, execute AGC coefficient recording mode again, or investigate the cause of the AGC coefficient $C_{AGC}$ being unacceptable.

Further, when it is confirmed that the correct AGC coefficient $C_{AGC}$ has been used, it is recognized that the displacement output from the demodulation processing unit 55 is sufficiently accurate.

The displacement information and the frequency information determined for the standard sample 17 serve as indices for evaluating the soundness of the standard sample 17. Therefore, for example, the output circuit 559 may have a function of acquiring the displacement information and the frequency information of the standard sample 17 and outputting this information to the control unit 57. The control unit 57 may have a function of displaying this information on the display unit 58, a function of evaluating the presence or absence of an abnormality in the standard sample 17 on the basis of a stored threshold value and displaying the evaluation result on the display unit 58, or the like. With these functions, the user can identify the soundness of the standard sample 17 and repair or replace the standard sample 17, as necessary.

4.7.1.2 Calculation of Value B

After the AGC coefficient $C_{AGC}$ is calculated as described above, the value B may be calculated and recorded, as necessary.

The value B calculator 544, in AGC coefficient recording mode, finds the measured value of the ratio $J_1(B)/J_2(B)$ of the Bessel coefficients on the basis of equation (22) from the amplitude V1 of the first signal S1, the amplitude V2 of the second signal S2, and the amplitude Vq of the reference signal Ss.

On the other hand, the theoretical value of the Bessel coefficient $J_1(B)$ and the theoretical value of the Bessel coefficient $J_2(B)$ can be calculated from the known Bessel function equations. Then, by fitting the measured value of the Bessel coefficient ratio $J_1(B)/J_2(B)$ to the theoretical value, an approximate value of the value B can be found.

Note that the relationship between the Bessel coefficient ratio $J_1(B)/J_2(B)$ and the value B calculated from the ratio may be formulated into a table and stored in the value B calculator 544. As a result, the value B calculator 544 can find the Bessel coefficient ratio $J_1(B)/J_2(B)$ from the calculated AGC coefficient $C_{AGC}$, and readily determine the value B. This makes it possible to reduce the calculation load and simplify the configuration of the value B calculator 544.

4.7.2 Measurement Mode

When measurement mode is selected, the control unit 57 controls the operation of the optical path switching unit 15, disposing the optical path changing element 153 in the second position P2, that is, moving the optical path changing element 153 to the second position P2 when in the first position P1. When the optical path changing element 153 is disposed in the second position P2, the emitted light L1 is incident on the measured object 14, generating the object light L3. When the object light L3 is received by the photoreceptor 10, the AGC unit 543 adjusts the amplitude of the second signal S2 derived from the object light L3 on the basis of the recorded AGC coefficient $C_{AGC}$. Specifically, the right side of equation (22) described above is multiplied by the second signal S2. Thus, the amplitude of the second signal S2 is aligned with the amplitude of the first signal S1. This makes it possible to eliminate unnecessary terms and extract necessary terms by addition in the adder 546. As a result, a signal that can be demodulated in the demodulation processing unit 55 can be outputted.

Note that, in the AGC unit 543, the amplitude of the second signal S2 may be adjusted by using the fixed value of the AGC coefficient $C_{AGC}$ recorded in AGC coefficient recording mode, but the amplitude Vq of the reference signal Ss included in the AGC coefficient $C_{AGC}$ may be replaced with the value acquired in real time That is, in measurement mode, at the timing of adjustment of the amplitude of the second signal S2, the AGC unit 543 may have a function of acquiring the amplitude Vq of the reference signal Ss detected by the reference signal amplitude detector 542 and reflecting the acquired amplitude Vq into the recorded AGC coefficient $C_{AGC}$, and a function of adjusting the amplitude of the second signal S2 by using the updated AGC coefficient $C_{AGC}$. Thus, even in a case in which the amplitude Vq of the reference signal Ss changes due to fluctuations in the power supply voltage, the temperature characteristics of the oscillation circuit 54, or the like, the changed amplitude Vq can be reflected in the AGC coefficient $C_{AGC}$. As a result, a more accurate AGC coefficient $C_{AGC}$ can be used to adjust the amplitude of the second signal S2.

As described above, the laser interferometer 1 according to this exemplary embodiment includes the light source 2, the optical modulator 12, the optical path switching unit 15, the standard sample 17 (reflector), and the photoreceptor 10.

The light source 2 emits the emitted light L1 (first laser light). The optical modulator 12 includes the vibrator 30 and modulates the emitted light L1 into the reference light L2 (second laser light) having a different frequency. The optical path switching unit 15 is disposed in the optical path 22 (first optical path) through which the emitted light L1 travels, and switches the direction of travel of the emitted light L1 between the optical path 22 and the optical path 23 (second optical path) different from the optical path 22. The standard sample 17 includes the light-reflecting surface 172 that moves along the optical path 23 and reflects the emitted light L1 traveling through the optical path 23. The photoreceptor 10 receives the first interference light of the object light L3 (third laser light) generated by the emitted light L1 being reflected by the measured object 14 (object to be measured) and the reference light L2, and the second interference light of the standard object light L4 (fourth laser light) generated by the emitted light L1 being reflecting by the light-reflecting surface 172 and the reference light L2, and outputs a light-receiving signal.

According to such a configuration, even in a case in which the value A dependent on the state of the measured object 14 is a value not suitable for demodulation processing in the demodulation circuit 52, the preprocessing necessary for demodulation processing and the subsequent demodulation processing can be performed appropriately. As a result, regardless of the state of the measured object 14, the information derived from the measured object 14 can be demodulated from the light-receiving signal with high demodulation accuracy, and the laser interferometer 1 capable of determining highly accurate displacement information, velocity information, and the like can be achieved. Further, the volume of the vibrator 30 of the optical modulator 12 is extremely small, and the power required for oscillation is also small, making it easy to reduce the size and the power consumption of the laser interferometer 1.

Further, the laser interferometer 1 includes the demodulation circuit 52. As described above, the demodulation circuit 52 is a circuit that demodulates information derived from the measured object 14 (object to be measured). Further, the demodulation circuit 52 includes the branching portion jp1, the first signal path ps1, the second signal path ps2, the first signal amplitude detector 540, the second signal amplitude detector 541, and the AGC unit 543. The branching portion jp1 divides the light-receiving signal into the first signal S1 and the second signal S2. The first signal path ps1 propagates the first signal S1. The second signal path ps2 propagates the second signal S2. The first signal amplitude detector 540 detects the amplitude of the first signal S1. The second signal amplitude detector 541 detects the amplitude of the second signal S2. When the optical path switching unit 15 switches the direction of travel of the emitted light L1 to the optical path 23 (second optical path), that is, when AGC coefficient recording mode is selected, as one example, the AGC unit 543 records the AGC coefficient $C_{AGC}$ on the basis of the amplitude of the first signal S1 and the amplitude of the second signal S2. Further, when the optical path switching unit 15 switches the direction of travel of the emitted light L1 to the optical path 22 (first optical path), that is, when measurement mode is selected, as one example, the AGC unit 543 adjusts the amplitude of the second signal S2 on the basis of the AGC coefficient $C_{AGC}$.

According to such a configuration, the AGC coefficient $C_{AGC}$ can be recorded in AGC coefficient recording mode before measurement of the measured object 14 in measurement mode. Thus, even in a case in which the AGC coefficient $C_{AGC}$ changes due to a change in the environment, the value can be updated to the latest value. As a result, the demodulation processing can be performed using a more correct AGC coefficient $C_{AGC}$, making it possible to ultimately find highly accurate displacement information, velocity information, and the like.

5. Operation of Control Unit

Figure 19:
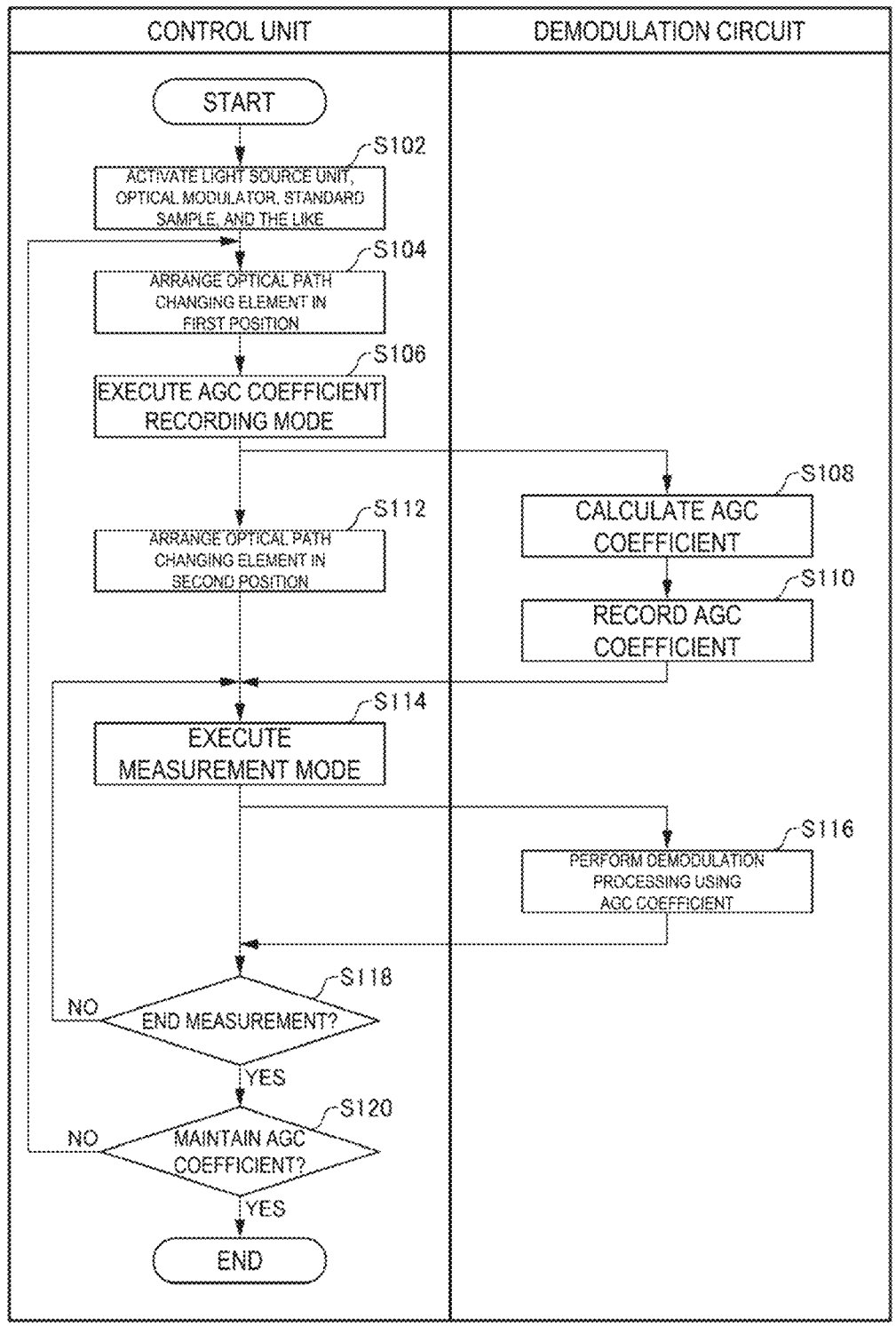
FIG. 19 is a flowchart for explaining the control of each portion by a control unit.

FIG. 19 is a flowchart for explaining the control of each portion by the control unit.

In step S102 illustrated in FIG. 19, the control unit 57 activates the light source 2, the optical modulator 12, the standard sample 17, and the like.

In step S104, the optical path changing element 153 is disposed in the first position P1 by the control of the control unit 57.

In step S106, AGC coefficient recording mode is executed in the control unit 57. As a result, the AGC unit 543 of the demodulation circuit 52 calculates the AGC coefficient $C_{AGC}$ in step S108, and records the calculated AGC coefficient $C_{AGC}$ in step S110. Subsequently, whether the calculated AGC coefficient $C_{AGC}$ is correct may be confirmed as necessary and, if not correct, the AGC coefficient $C_{AGC}$ may be calculated again.

In step S112, the optical path changing element 153 is disposed in the second position P2 by the control of the control unit 57.

In step S114, measurement mode is executed in the control unit 57. As a result, in step S116, the demodulation circuit 52 performs demodulation processing using the recorded AGC coefficient $C_{AGC}$. As a result, information derived from the measured object 14 can be acquired.

In step S118, whether measurement mode is to be ended is determined in the control unit 57. In a case in which the AGC coefficient $C_{AGC}$ is unsuitable, measurement mode may be temporarily terminated, and the AGC coefficient $C_{AGC}$ may be updated via step S120 described below. In a case in which the AGC coefficient $C_{AGC}$ is correct and measurement may continue, the flow returns to step S114 and measurement is continued.

In step S120, whether the AGC coefficient $C_{AGC}$ is to be maintained is determined. In a case in which the AGC coefficient $C_{AGC}$ is correct, the flow is ended. In a case in which the AGC coefficient $C_{AGC}$ is unsuitable, the flow returns to step S104.

6. First Modified Example

Next, a laser interferometer according to a first modified example will be described.

Figure 20:
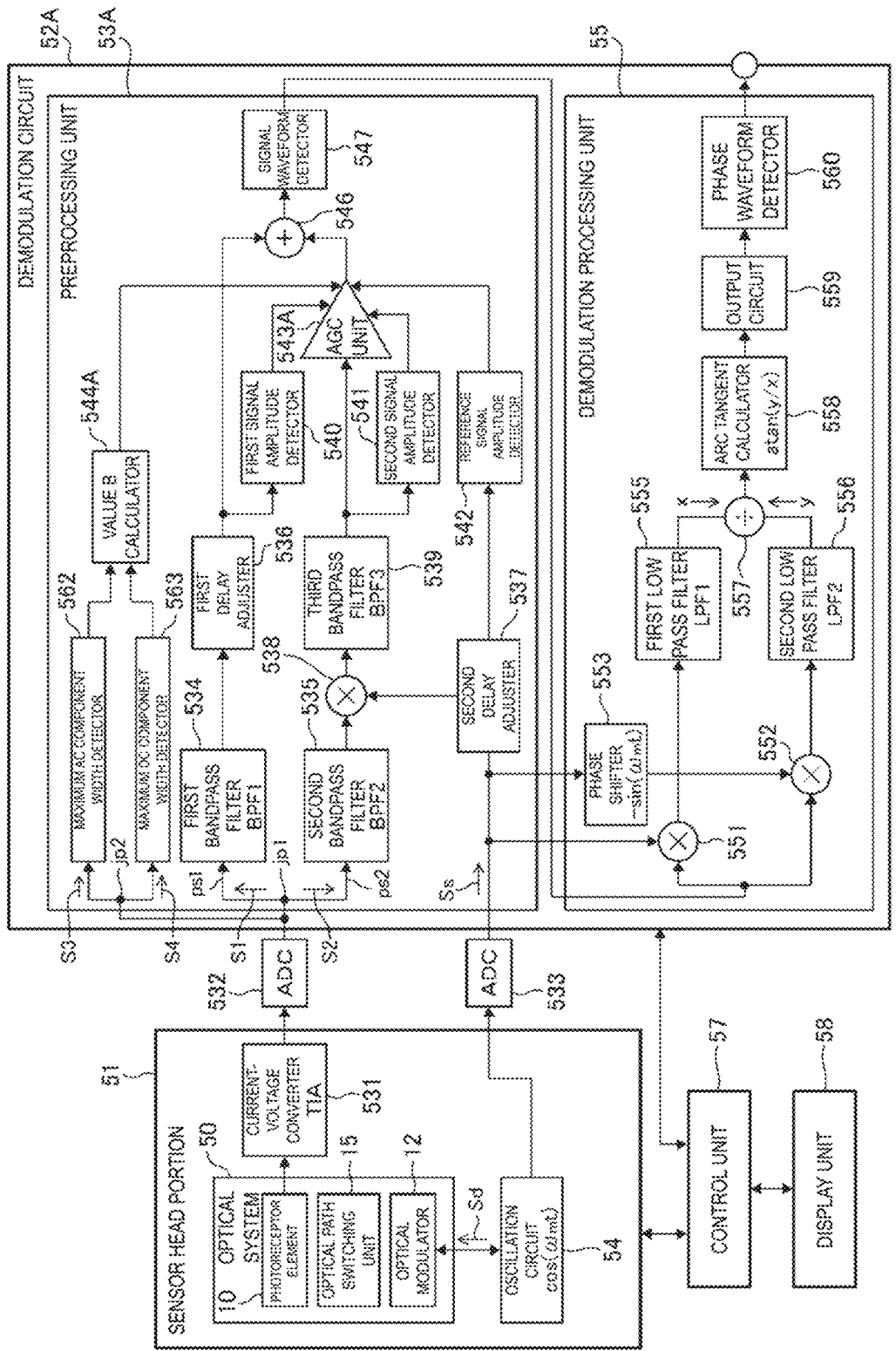
FIG. 20 is a functional block diagram illustrating a demodulation circuit of the laser interferometer according to a first modified example.

FIG. 20 is a functional block diagram illustrating a demodulation circuit of a laser interferometer according to the first modified example.

While the first modified example will be described below, the below description will focus on differences from the exemplary embodiment described above, and description of similar matters will be omitted. Note that, in each drawing, components that are the same as those of the exemplary embodiment described above are denoted using the same reference signs.

A demodulation circuit 52A illustrated in FIG. 20 is the same as the demodulation circuit 52 illustrated in FIG. 1 except that the configuration of an AGC unit 543A and a value B calculator 544A are different.

In the exemplary embodiment described above, the AGC unit 543 calculates the AGC coefficient $C_{AGC}$ from the amplitude V1 of the first signal S1, the amplitude V2 of the second signal S2, and the amplitude Vq of the reference signal Ss. Further, the value B is calculated in the value B calculator 544 from the parameters used in the calculation of the AGC coefficient $C_{AGC}$.

In contrast, in the first modified example, the value B is calculated in the value B calculator 544A on the basis of the light-receiving signal before input to the preprocessing unit 53. Then, the AGC unit 543A calculates the AGC coefficient $C_{AGC}$ on the basis of the amplitude V1 of the first signal S1, the amplitude V2 of the second signal S2, the amplitude Vq of the reference signal Ss, and the calculated value B.

In addition to the configuration provided with the preprocessing unit 53 described above, a preprocessing unit 53A illustrated in FIG. 20 includes a maximum AC component width detector 562, a maximum DC component width detector 563, the value B calculator 544A, and the AGC unit 543A.

In the preprocessing unit 53A, the light-receiving signal output from ADC 532 is divided into the two signals of a third signal S3 and a fourth signal S4 at a branching portion jp2. The third signal S3 is input to the maximum AC component width detector 562 and the fourth signal S4 is input to the maximum DC component width detector 563. The maximum AC component width detector 562, in AGC coefficient recording mode, detects a maximum AC component width for the light-receiving signal that includes the standard sample signal. The maximum DC component width detector 563, in AGC coefficient recording mode, detects a maximum DC component width for the light-receiving signal that includes the standard sample signal.

Figure 21:
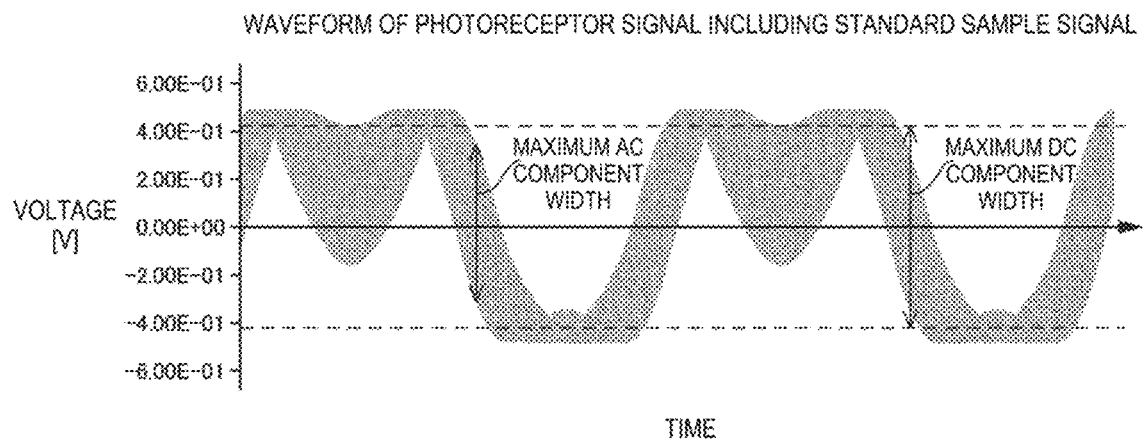
FIG. 21 illustrates an example of a waveform of a light-receiving signal including a standard sample signal.

FIG. 21 illustrates an example of a waveform of the light-receiving signal including the standard sample signal.

In the waveform illustrated in FIG. 21, components having a relatively long cycle and components having a relatively short cycle overlap. Components having a relatively long cycle correspond to DC components and components having a relatively short cycle correspond to AC components. Note that, because the AC component has an extremely short cycle, the waveform is not drawn in an exploded view in FIG. 21, but rather filled. Note that the waveform illustrated in FIG. 21 is a waveform example in which the frequency of the standard sample signal is 10 kHz, the displacement amount La of the light-reflecting surface 172 of the standard sample 17 is 150 nm, the frequency of the modulated signal of the optical modulator 12 is 5 MHz, and the wavelength of the emitted light L1 is 850 nm.

The maximum DC component width, as illustrated in FIG. 21, is the maximum width of the entire light-receiving signal when the AC component is removed, and the maximum AC component width, as illustrated in FIG. 21, is the amplitude of the AC component at a center position of the width of the DC component. The maximum AC component width detector 562 has the function of detecting the maximum AC component width. The maximum DC component width detector 563 has the function of detecting the maximum DC component width.

Here, the inventors have found that the ratio of the maximum AC component width to the maximum DC component width has a correlation with the value B. With use of this correlation, the value B can be calculated from the ratio of the maximum AC component width to the maximum DC component width in the value B calculator 544A. Then, the AGC unit 543A can calculate the AGC coefficient $C_{AGC}$ by using this value B.

Figure 22:
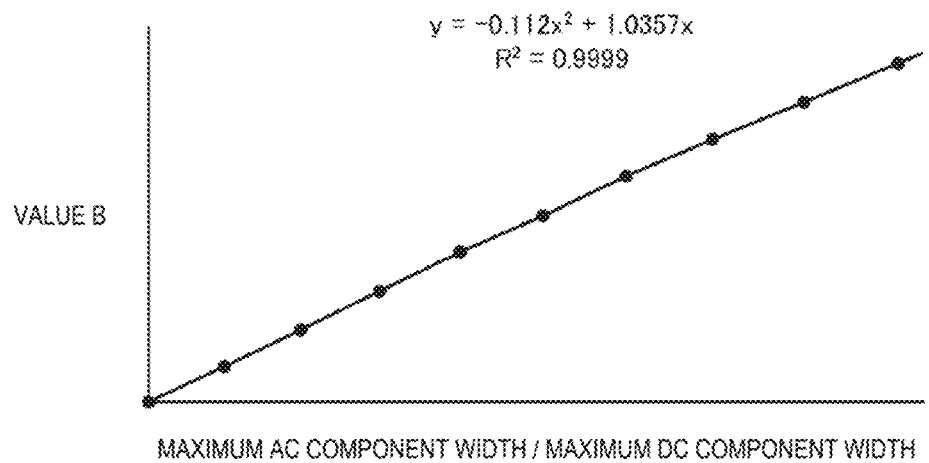
FIG. 22 is an example of a graph showing a correlation established between a ratio of a maximum AC component width to a maximum DC component width and a value B.

FIG. 22 is an example of a graph showing the correlation established between the ratio of the maximum AC component width to the maximum DC component width and the value B. In the graph shown in FIG. 22, the horizontal axis (x axis) is the ratio of the maximum AC component width to the maximum DC component width, and the vertical axis (y axis) is the value B. As shown in FIG. 22, with the ratio of the maximum AC component width to the maximum DC component width and the value B, a function is established in which a coefficient $R^2$ of determination is sufficiently large. Accordingly, on the basis of this function, the value B can be readily calculated in the value B calculator 544A. Note that the equation of the function shown in FIG. 22 is an example, and is not limited thereto.

Further, this function may be formulated into a table and stored in the value B calculator 544A. Thus, the value B calculator 544A can simply determine the value B. This makes it possible to reduce the load of computation and simplify the configuration of the value B calculator 544A.

In the AGC unit 543A, the AGC coefficient $C_{AGC}$ is calculated on the basis of the amplitude V1 of the first signal S1, the amplitude V2 of the second signal S2, the amplitude Vq of the reference signal Ss, and the calculated value B. Then, the calculated AGC coefficient $C_{AGC}$ is recorded.

Figure 23:
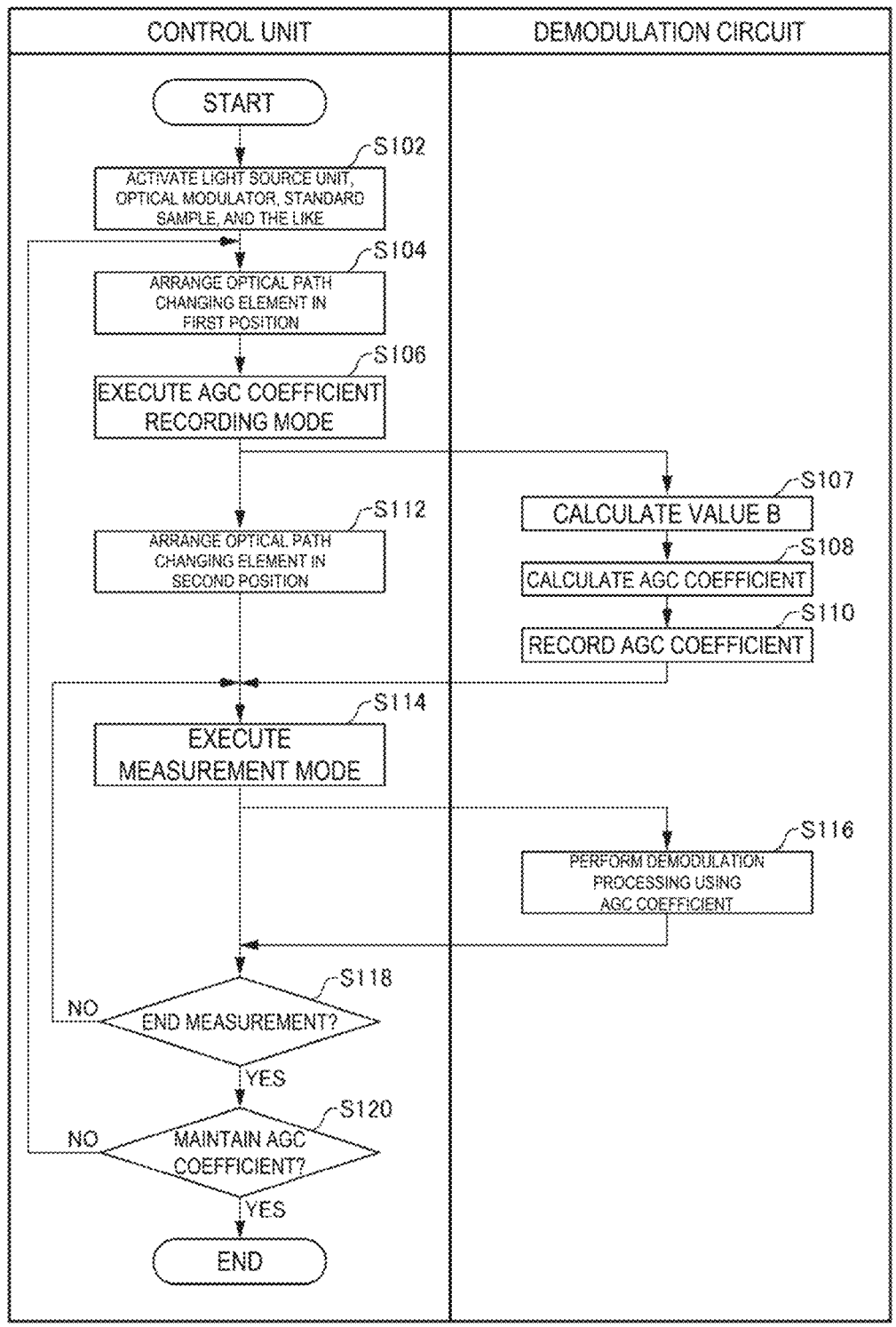
FIG. 23 is a flowchart for explaining the control of each portion by the control unit illustrated in FIG. 20.

FIG. 23 is a flowchart for explaining the control of each portion by the control unit illustrated in FIG. 20. In the following, only the differences from the flowchart illustrated in FIG. 19 will be described.

In step S107, the value B calculator 544A of the demodulation circuit 52 calculates the value B. In step S108, the AGC unit 543A calculates the AGC coefficient $C_{AGC}$ on the basis of the calculated value B and the like.

As described above, the laser interferometer 1 according to the first modified example includes the demodulation circuit 52A. The demodulation circuit 52A, as described above, is a circuit that demodulates information derived from the measured object 14 (object to be measured). Further, the demodulation circuit 52A includes the branching portion jp1, the first signal path ps1, the second signal path ps2, the first signal amplitude detector 540, the second signal amplitude detector 541, the value B calculator 544A (index calculation unit), and the AGC unit 543A. The branching portion jp1 divides the light-receiving signal into the first signal S1 and the second signal S2. The first signal path ps1 propagates the first signal S1. The second signal path ps2 propagates the second signal S2. The first signal amplitude detector 540 detects the amplitude of the first signal S1. The second signal amplitude detector 541 detects the amplitude of the second signal S2. When the optical path switching unit 15 switches the direction of travel of the emitted light L1 to the optical path 23 (second optical path), that is, when AGC coefficient recording mode is selected, as one example, the value B calculator 544A calculates and records the value B from the light-receiving signal on the basis of the correlation established between the waveform of the light-receiving signal and the value B (index related to the optical modulator 12). When the optical path switching unit 15 switches the direction of travel of the emitted light L1 to the optical path 22 (first optical path), that is, when measurement mode is selected, as one example, the AGC unit 543A adjusts the amplitude of the second signal S2 on the basis of the AGC coefficient $C_{AGC}$.

According to such a configuration, the AGC coefficient $C_{AGC}$ can be recorded in AGC coefficient recording mode before measurement of the measured object 14 in measurement mode. Thus, even in a case in which the AGC coefficient $C_{AGC}$ changes due to a change in the environment, the value can be updated to the latest value. As a result, the demodulation processing can be performed using a more correct AGC coefficient $C_{AGC}$, making it possible to ultimately find highly accurate displacement information, velocity information, and the like.

7. Second Modified Example

Next, a laser interferometer according to a second modified example will be described.

Figure 24:
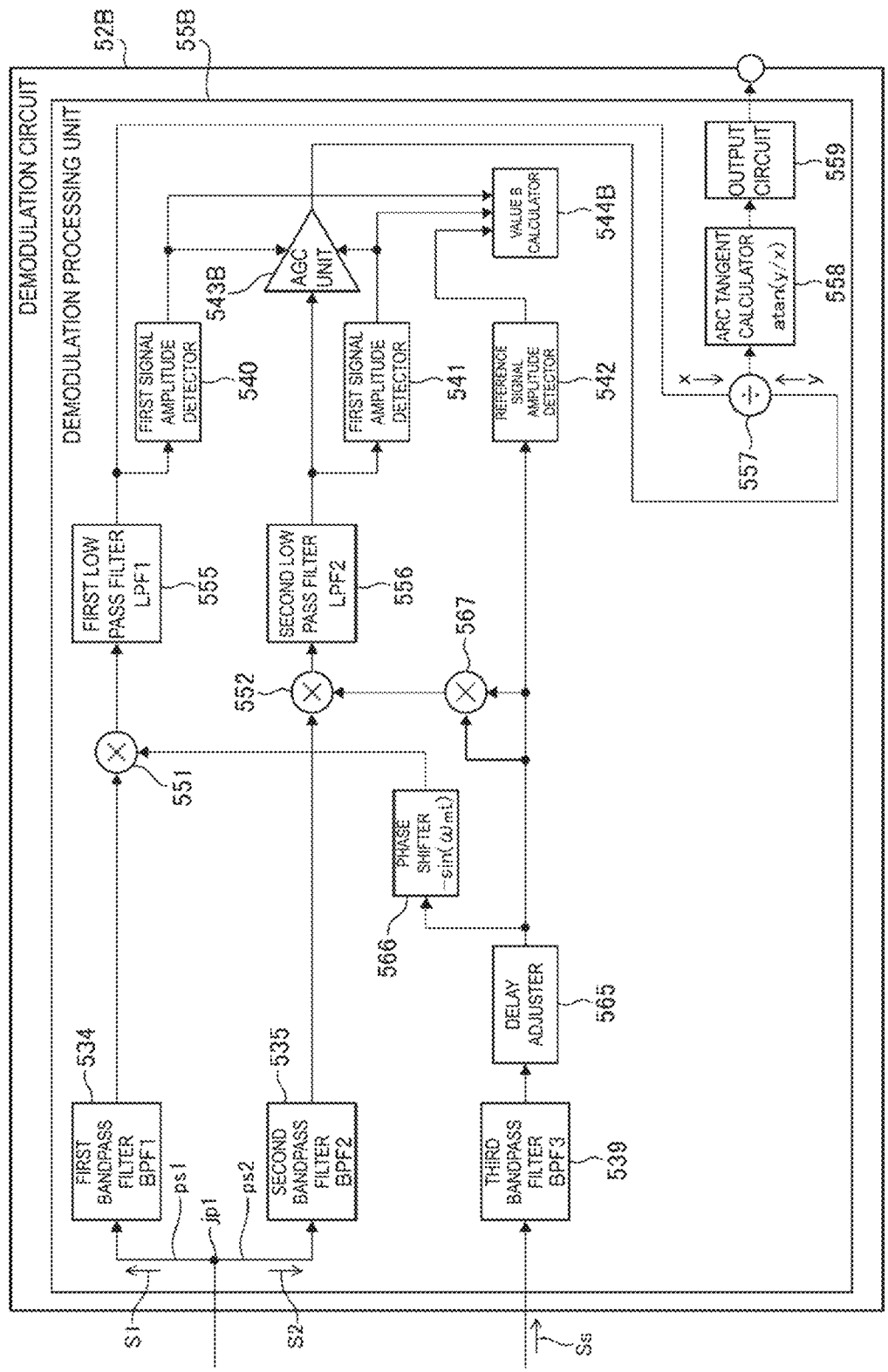
FIG. 24 is a functional block diagram illustrating a demodulation circuit of the laser interferometer according to a second modified example.

FIG. 24 is a functional block diagram illustrating a demodulation circuit of the laser interferometer according to the second modified example.

While the second modified example will be described below, the below description will focus on differences from the exemplary embodiment described above, and description of similar matters will be omitted. Note that, in each drawing, components that are the same as those of the exemplary embodiment described above are denoted using the same reference signs.

A demodulation circuit 52B illustrated in FIG. 24 is the same as the demodulation circuit 52 illustrated in FIG. 1 except that the configuration of a demodulation processing unit 55B is different. Note that, although the order of the signal processing is different, the basic demodulation principle of the demodulation circuit 52B is the same as that of the demodulation circuit 52.

In addition to the components of the preprocessing unit 53 described above, the demodulation circuit 52B includes a delay adjuster 565, a phase shifter 566, a multiplier 567, an AGC unit 543B, and a value B calculator 544B.

In the first signal path ps1, the first bandpass filter 534, the multiplier 551, and the first low pass filter 555 are provided in this order between the branching portion jp1 and the divider 557 from the branching portion jp1 side.

In the second signal path ps2, the second bandpass filter 535, the multiplier 552, and the second low pass filter 556 are provided in this order between the branching portion jp1 and the divider 557 from the branching portion jp1 side.

The first signal S1 is passed through the first bandpass filter 534 disposed on the first signal path ps1, and then the signal is multiplied in the multiplier 551. The signal multiplied in the multiplier 551 is a signal obtained by the reference signal Ss being sequentially passed through the third bandpass filter 539, the delay adjuster 565, and the phase shifter 566. Note that the delay adjuster 565 has a configuration similar to that of the first delay adjuster 536 illustrated in FIG. 1. Further, the phase shifter 566 has a configuration similar to that of the phase shifter 553 illustrated in FIG. 1. The output signal of the multiplier 551 is passed through the first low-pass filter 555 and subsequently input to the divider 557. The first signal S1 input to the divider 557 is referred to as signal x.

The second signal S2 passes through the second bandpass filter 535 disposed on the second signal path ps2, and then the signal is multiplied in the multiplier 552. The signal multiplied in the multiplier 552 is a signal obtained by the reference signal Ss being sequentially passed through the third bandpass filter 539 and the delay adjuster 565, and then squared by the multiplier 567.

The AGC unit 543B, in AGC coefficient recording mode, calculates and records the AGC coefficient $C_{AGC}$ on the basis of the amplitude V1 of the first signal S1, the amplitude V2 of the second signal S2, and the amplitude Vq of the reference signal Ss. Further, in measurement mode, the AGC unit 543B adjusts the amplitude of the second signal S2 on the basis of the recorded AGC coefficient $C_{AGC}$ and the newly detected amplitude of the second signal S2 and amplitude of the reference signal Ss. Then, the second signal S2 after amplitude adjustment is input to the divider 557. The second signal S2 input to the divider 557 is referred to as signal y.

The divider 557 divides the signal y by the signal x, passes the output y/x through the arc tangent calculator 558, and determines the output atan(y/x). Subsequently, the output atan(y/x) is passed through the output circuit 559, and thus a phase $\varphi_d$ is determined as information derived from the measured object 14.

Further, the value B calculator 544B calculates the value B on the basis of the amplitude V1 of the first signal S1, the amplitude V2 of the second signal S2, and the amplitude Vq of the reference signal Ss detected in AGC coefficient recording mode.

In such a second modified example described above as well, the same effects as those in the exemplary embodiment described above can be achieved.

8. Third and Fourth Modified Examples

Next, laser interferometers according to third and fourth modified examples will be described.

Figure 25:
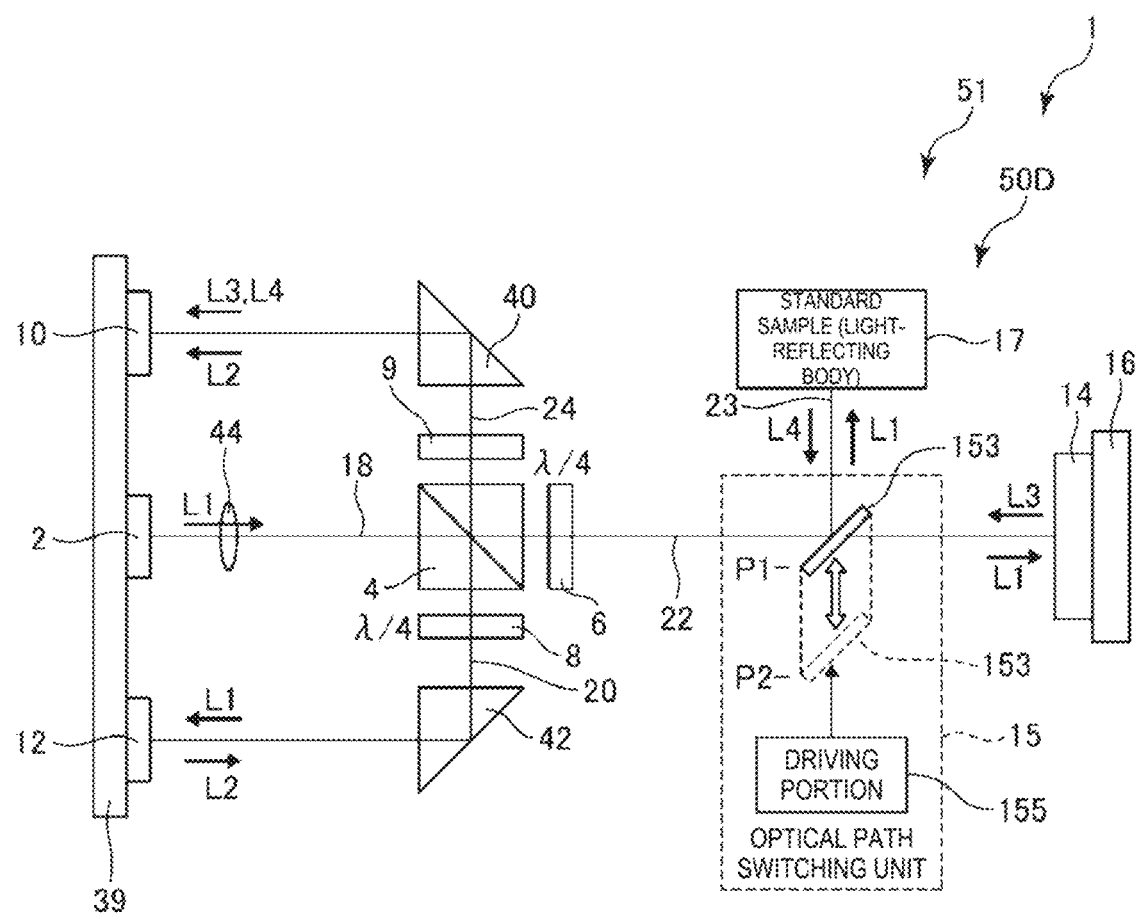
FIG. 25 is a schematic configuration diagram illustrating a mounting structure of an optical system of the laser interferometer according to a third modified example.
Figure 26:
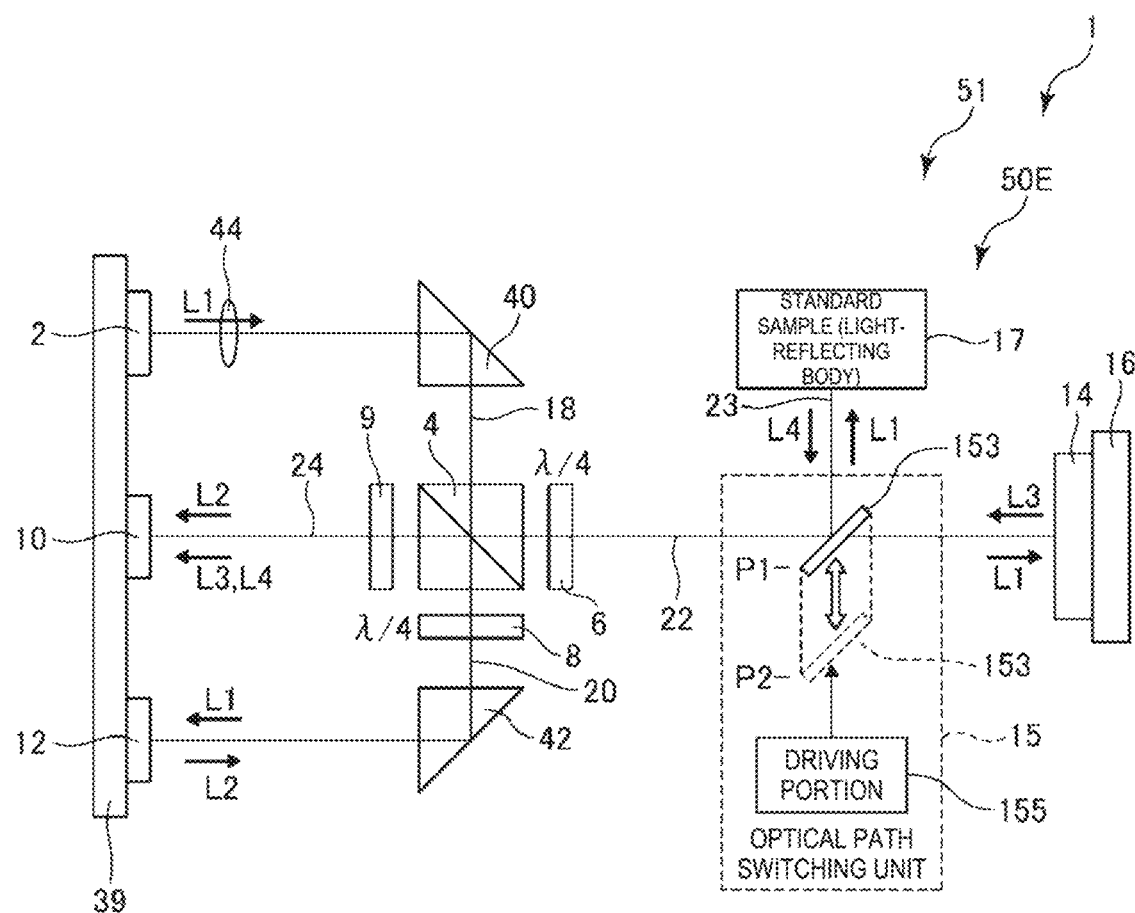
FIG. 26 is a schematic configuration diagram illustrating a mounting structure of an optical system of the laser interferometer according to a fourth modified example.

FIG. 25 is a schematic configuration diagram illustrating a mounting structure of an optical system of a laser interferometer according to the third modified example. FIG. 26 is a schematic configuration diagram illustrating a mounting structure of an optical system of the laser interferometer according to the fourth modified example.

While the third and fourth modified examples will be described below, the below description will focus on differences from the exemplary embodiment described above, and description of similar matters will be omitted. Note that, in FIG. 25 and FIG. 26, components that are the same as those of the exemplary embodiment described above are denoted using the same reference signs.

An optical system 50D of the laser interferometer 1 illustrated in FIG. 25 includes a substrate 39. The light source 2, the optical modulator 12, and the photoreceptor 10 are each mounted on this substrate 39. Then, in the substrate 39 illustrated in FIG. 25, the photoreceptor 10, the light source 2, and the optical modulator 12 are disposed in this order in a direction orthogonal to the optical path 22.

Further, the optical system 50D illustrated in FIG. 25 includes prisms 40, 42. The prism 40 is provided on the optical path 24 between the photoreceptor 10 and the analyzer 9. The prism 42 is provided on the optical path 20 between the optical modulator 12 and the quarter wavelength plate 8.

Furthermore, the optical system 50D illustrated in FIG. 25 includes a convex lens 44. The convex lens 44 is provided on the optical path 18 between the light source 2 and the polarizing beam splitter 4. With the convex lens 44 thus provided, the emitted light L1 emitted from the light source 2 can be focused and effectively utilized.

Then, the optical path switching unit 15 illustrated in FIG. 25 is disposed on the optical path 22 between the polarizing beam splitter 4 and the measured object 14.

An optical system 50E of the laser interferometer 1 illustrated in FIG. 26 is the same as the optical system 50D illustrated in FIG. 25 except that the arrangement of the elements and the like is different.

In the substrate 39 illustrated in FIG. 26, the light source 2, the photoreceptor 10, and the optical modulator 12 are disposed in this order in a direction orthogonal to the optical path 22. The prism 40 is provided on the optical path 18, and the prism 42 is provided on the optical path 20.

Then, the optical path switching unit 15 illustrated in FIG. 26 is disposed on the optical path 22 between the polarizing beam splitter 4 and the measured object 14.

According to such mounting structures illustrated in FIG. 25 and FIG. 26 described above, the laser interferometer 1 can be easily made smaller. Note that the arrangement of elements is not limited to the illustrated arrangement.

In the mounting structures illustrated in FIG. 25 and FIG. 26, the size of the photoreceptor 10 is, for example, 0.1 mm square, the size of the light source 2 is, for example, 0.1 mm square, and the size of the optical modulator 12 is, for example, from 0.5 to 10 mm square. Then, the size of the substrate 39 on which these are mounted is, for example, from 1 to 10 mm square. As a result, the size of the optical system can be reduced to the size of this substrate 39.

In such third and fourth modified examples described above as well, the same effects as those in the exemplary embodiment described above can be achieved.

Although the laser interferometer according to the disclosure has been described on the bases of the illustrated exemplary embodiment, the disclosure is not limited by the exemplary embodiment described above, and the configuration of each portion can be replaced with any configuration having the same function. Further, any other desired component may be added to the laser interferometer according to the exemplary embodiment. Further, exemplary embodiments of the disclosure may be a combination of any two or more of the exemplary embodiment described above and each of the modified examples described above.

What is claimed is:

1. A laser interferometer comprising:
    a light source configured to emit first laser light;
    a beam splitter configured to split the first laser light in a first part of the first laser light towards an optical modulator and a second part of the first laser light towards an optical path switching unit;
    the optical modulator including a vibrator and configured to modulate, by the vibrator, the first part of the first laser light into second laser light having a different frequency;
    the optical path switching unit disposed in a first optical path through which the second part of the first laser light travels and configured to switch a direction of travel of the second part of the first laser light between the first optical path and a second optical path different from the first optical path;
    a reflector including a light-reflecting surface configured to move along the second optical path and reflect the second part of the first laser light traveling through the second optical path; and
    a photoreceptor configured to
        receive first interference light of the second laser light and third laser light generated by reflection of the second part of the first laser light on an object to be measured, and second interference light of the second laser light and fourth laser light generated by reflection of the second part of the first laser light on the light-reflecting surface, and
        output a light-receiving signal.

2. The laser interferometer according to claim 1, wherein the optical path switching unit includes
    a mirror configured to move to a first position and a second position, and
    an actuator configured to move the mirror,
    the first position being a position in which the mirror changes a direction of travel of the first laser light, and
    the second position being a position in which the mirror does not change the direction of travel of the first laser light.

3. The laser interferometer according to claim 2, wherein
    the light-reflecting surface is configured to vibrate in simple harmonic motion along the second optical path, and
    $La \geq \lambda/8$, given La as a displacement amount of the light-reflecting surface and $\lambda$ as a wavelength of the first laser light.

4. The laser interferometer according to claim 3, wherein the reflector is a piezoelectric element or a micro-electromechanical systems (MEMS).

5. The laser interferometer according to claim 4, wherein the reflector includes a light-reflecting surface driving portion configured to move the light-reflecting surface.

6. The laser interferometer according to claim 5, comprising:
    circuitry for demodulating information derived from the object to be measured from the light-receiving signal configured to:
        divide the light-receiving signal into a first signal and a second signal,
        propagate the first signal and the second signal,
        detect an amplitude of the first signal,
        detect an amplitude of the second signal,
        record an automatic gain control (AGC) coefficient based on the amplitude of the first signal and the amplitude of the second signal when the optical path switching unit switches the direction of travel of the second part of the first laser light to the second optical path, and
        adjust the amplitude of the second signal based on the AGC coefficient when the optical path switching unit switches the direction of travel of the second part of the first laser light to the first optical path.

7. The laser interferometer according to claim 5, comprising:
    circuitry for demodulating information derived from the object to be measured from the light-receiving signal configured to:
        divide the received signal into a first signal and a second signal,
        propagate the first signal and the second signal,
        detect an amplitude of the first signal,
        detect an amplitude of the second signal,
        calculate, from the light-receiving signal, an index related to the optical modulator based on a correlation between a waveform of the light-receiving signal and the index and record the index when the optical path switching unit switches the direction of travel of the second part of the first laser light to the second optical path, and
        calculate an automatic gain control (AGC) coefficient from the index and, when the optical path switching unit switches the direction of travel of the second part of the first laser light to the first optical path, adjust the amplitude of the second signal based on the AGC coefficient.

8. The laser interferometer according to claim 3, wherein the reflector includes a light-reflecting surface driving portion configured to move the light-reflecting surface.

9. The laser interferometer according to claim 2, wherein the reflector is a piezoelectric element or a micro-electromechanical systems (MEMS).

10. The laser interferometer according to claim 9, wherein the reflector includes a light-reflecting surface driving portion configured to move the light-reflecting surface.

11. The laser interferometer according to claim 2, wherein the reflector includes a light-reflecting surface driving portion configured to move the light-reflecting surface.

12. The laser interferometer according to claim 1, wherein
the light-reflecting surface is configured to vibrate in simple harmonic motion along the second optical path, and $La \geq \lambda/8$, given La as a displacement amount of the light-reflecting surface and $\lambda$ as a wavelength of the first laser light.

13. The laser interferometer according to claim 12, wherein the reflector is a piezoelectric element or a micro-electromechanical systems (MEMS).

14. The laser interferometer according to claim 13, wherein the reflector includes a light-reflecting surface driving portion configured to move the light-reflecting surface.

15. The laser interferometer according to claim 12, wherein the reflector includes a light-reflecting surface driving portion configured to move the light-reflecting surface.

16. The laser interferometer according to claim 1, wherein the reflector is a piezoelectric element or a micro-electromechanical systems (MEMS).

17. The laser interferometer according to claim 16, wherein the reflector includes a light-reflecting surface driving portion configured to move the light-reflecting surface.

18. The laser interferometer according to claim 1, wherein the reflector includes a light-reflecting surface driving portion configured to move the light-reflecting surface.

19. The laser interferometer according to claim 1, comprising:
circuitry for demodulating information derived from the object to be measured from the light-receiving signal configured to:
divide the light-receiving signal into a first signal and a second signal,
propagate the first signal and the second signal,
detect an amplitude of the first signal,
detect an amplitude of the second signal,
record an automatic gain control (AGC) coefficient based on the amplitude of the first signal and the amplitude of the second signal when the optical path switching unit switches the direction of travel of the second part of the first laser light to the second optical path, and
adjust the amplitude of the second signal based on the AGC coefficient when the optical path switching unit switches the direction of travel of the second part of the first laser light to the first optical path.

20. The laser interferometer according to claim 1, comprising:
circuitry for demodulating information derived from the object to be measured from the light-receiving signal configured to:
divide the received signal into a first signal and a second signal,
propagate the first signal and the second signal,
detect an amplitude of the first signal,
detect an amplitude of the second signal,
calculate, from the light-receiving signal, an index related to the optical modulator based on a correlation between a waveform of the light-receiving signal and the index and record the index when the optical path switching unit switches the direction of travel of the second part of the first laser light to the second optical path, and
calculate an automatic gain control (AGC) coefficient from the index and, when the optical path switching unit switches the direction of travel of the second part of the first laser light to the first optical path, adjust the amplitude of the second signal based on the AGC coefficient.

* * * * *